United States Patent
Aoki

(10) Patent No.: US 9,018,876 B2
(45) Date of Patent: Apr. 28, 2015

(54) ELECTRIC POWER STEERING APPARATUS

(75) Inventor: Kenichiro Aoki, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 21 days.

(21) Appl. No.: 13/821,654

(22) PCT Filed: Feb. 21, 2011

(86) PCT No.: PCT/JP2011/053731
§ 371 (c)(1),
(2), (4) Date: Mar. 8, 2013

(87) PCT Pub. No.: WO2012/114442
PCT Pub. Date: Aug. 30, 2012

(65) Prior Publication Data
US 2013/0320893 A1  Dec. 5, 2013

(51) Int. Cl.
*H02P 7/00* (2006.01)
*H02P 23/00* (2006.01)
*B62D 5/04* (2006.01)

(52) U.S. Cl.
CPC .......... *H02P 23/0072* (2013.01); *B62D 5/0484* (2013.01); *B62D 5/049* (2013.01)

(58) Field of Classification Search
CPC .................................................. H02P 23/0072
USPC ............. 318/400.01, 400.02, 400.07, 400.14, 318/400.15, 400.22, 432, 799, 400.26, 318/400.27, 400.28, 400.29, 599, 811; 74/398, 388 PS; 180/12, 213; 361/30, 361/31
See application file for complete search history.

(56) References Cited

U.S. PATENT DOCUMENTS

| | | | |
|---|---|---|---|
| 5,927,430 A | 7/1999 | Mukai et al. | |
| 7,406,375 B2* | 7/2008 | Fujita et al. | 701/41 |
| 7,791,293 B2* | 9/2010 | Nagase et al. | 318/400.01 |

FOREIGN PATENT DOCUMENTS

| | | |
|---|---|---|
| JP | A 10-167086 | 6/1998 |
| JP | A 11-49002 | 2/1999 |
| JP | A 2001-287658 | 10/2001 |
| JP | A 2003-48560 | 2/2003 |
| JP | A-2005-88877 | 4/2005 |
| JP | A 2008-37380 | 2/2008 |

OTHER PUBLICATIONS

May 31, 2011 Written Opinion issued in International Patent Application No. PCT/JP2011/053731 (with translation).

* cited by examiner

*Primary Examiner* — Antony M Paul
(74) *Attorney, Agent, or Firm* — Oliff

(57) ABSTRACT

When a current sensor fails, instead of a normal-time motor control section, an abnormal-time motor control section drives and controls a motor. The abnormal-time motor control section detects a timing at which motor current I becomes zero in a state in which all the switching devices are turned off (S11 to S13). Every time the motor current I becomes zero, the abnormal-time motor control section sets an ON time T0 corresponding to steering torque |tr| (S14 to S15), and turns on the switching devices corresponding to the direction of the steering torque for the ON time T0 (S17 to S20). With this operation, an average current Iavg corresponding to the steering torque |tr| flows through the motor 20, whereby deterioration of the followability of steering assist is suppressed.

6 Claims, 20 Drawing Sheets

ELECTRIC POWER STEERING APPARATUS

TECHNICAL FIELD

The present invention relates to an electric power steering apparatus which drives a motor in accordance with steering operation performed by a driver, to thereby generate steering assist torque.

BACKGROUND ART

Conventionally, an electric power steering apparatus detects the steering torque applied to a steering wheel by a driver, and computes a target steering assist torque corresponding to the detected steering torque, and controls the supply of electricity to a motor so as to obtain the computed target steering assist torque. In general, the electric power steering apparatus calculates a target current which is proportional to the target steering assist torque, detects the current actually flowing through the motor by use of a current sensor, and applies to the motor a voltage corresponding to the difference between the target current and the current actually flowing through the motor. That is, the electric power steering apparatus drives and controls the motor while performing feedback control.

In the case where the current sensor has suffered a failure, feedback control cannot be performed. Patent Document 1 proposed the electric power steering apparatus which assists steering even in such a case where the current sensor has suffered a failure. The electric power steering apparatus proposed in Patent Document 1 changes its control mode from feedback control to open loop control when a current sensor failure is detected. That is, the electric power steering apparatus controls switching devices of a motor driver circuit at a duty ratio set such that a voltage whose magnitude is proportional to the steering torque is applied to the motor.

PRIOR ART DOCUMENT

Patent Document

Patent Document 1: Japanese Patent Application Laid-Open (kokai) No. 2005-88877

However, in the case where the motor is driven by the above-described open loop control, the followability of the steering assist to the steering operation becomes extremely low, as compared with the case where feedback control is performed. Namely, the steering assist which can be provided when the steering operation is performed at high speed drops considerably. This is because voltage drop generated in the motor due to counter electromotive voltage is not used as a motor control quantity for performing the open loop control. When the motor rotates, the motor coil generates a counter electromotive voltage. Therefore, even in the case where the target application voltage of the motor is 5 V, for example, if the counter electromotive voltage is 3 V, only a current corresponding to 2 V, which is the difference between the target application voltage and the counter electromotive voltage, flows through the motor. In the case where the counter electromotive voltage exceeds the application voltage as a result of a further increase in the rotational speed of the motor, energy returns to the motor drive circuit (the power supply side) due to the difference between the counter electromotive voltage and the application voltage. In such a case, the steering assist becomes impossible or the steering operation is braked. Therefore, in the case where the current sensor fails, a greater force is required to rotate the steering wheel for performing the steering operation.

The present invention has been accomplished in order to solve the above-described problem, and its object is to suppress deterioration of the followability of steering assist to thereby continue adequate steering assist even in the case where a current sensor fails.

In order to achieve the above-described object, the present invention provides an electric power steering apparatus comprising steering torque detection means (21) for detecting steering torque input from a steering wheel to a steering shaft; a motor (20) provided in a steering mechanism and generating steering assist torque; a motor drive circuit (40) composed of an H bridge circuit including switching devices (Q1H, Q2L) for normal rotation which are turned on so as to drive the motor in a normal rotation direction and switching devices (Q2H, Q1L) for reverse rotation which are turned on so as to drive the motor in a reverse rotation direction; motor current detection means (31) for detecting motor current flowing through the motor; anomaly detection means (91) for detecting an anomaly of the motor current detection means; normal-time motor control means (70), operable when the anomaly of the motor current detection means is not detected, for controlling the motor drive circuit by current feedback control based on a target current set in accordance with the steering torque detected by the steering torque detection means and the motor current detected by the motor current detection means; and abnormal-time motor control means (80), operable when the anomaly of the motor current detection means is detected, for controlling the motor drive circuit on the basis of the steering torque, detected by the steering torque detection means, without use of the current feedback control. The electric power steering apparatus is characterized in that the abnormal-time motor control means includes an off-state-voltage detection section (S11, S12, S52, S53) which detects voltage between terminals of the motor in a state in which the motor drive circuit is controlled so as not to apply a power supply voltage between the terminals of the motor; a current-zero timing detection section (S13, S36, S40) which detects a timing at which the current flowing through the motor becomes zero on the basis of the voltage between the terminals of the motor detected by the off-state-voltage detection section; an energization time setting section (S15, S32) which sets an energization time corresponding to the steering torque detected by the steering torque detection means; and a switching control section (S18, S19, S20, S33, S34, S37, S38) which turns on the switching devices for normal rotation or the switching devices for reverse rotation for the energization time, set by the energization time setting section, every time the current-zero timing detection section detects the timing at which the current flowing through the motor becomes zero.

In the present invention, current flows from the motor drive circuit to the motor, whereby the motor generates steering assist torque. The motor drive circuit is formed by an H bridge circuit including switching devices for normal rotation and switching devices for reverse rotation. Accordingly, the motor is a brushed motor. For example, the switching devices for normal rotation include a switching device which connects one electricity supply terminal of the motor to a power supply, and a switching device which connects the other electricity supply terminal of the motor to a ground; and the switching devices for reverse rotation include a switching device which connects the other electricity supply terminal of the motor to the power supply, and a switching device which connects the one electricity supply terminal of the motor to the ground. In the motor drive circuit, the switching devices for normal rotation are turned on when the motor is caused to rotate in the normal direction, and the switching devices for reverse rotation are turned on when the motor is caused to rotate in the reverse direction. The current flowing through the motor is adjusted by adjusting the times over which the switching devices are turned on, whereby the steering assist torque is adjusted.

The normal-time motor control means controls the motor drive circuit by current feedback control based on the target current set in accordance with the steering torque detected by the steering torque detection means and the motor current detected by the motor current detection means, to thereby generate adequate steering assist torque. In the case where the motor current detection means fails, such current feedback control cannot be performed. In order to overcome such a drawback, the present invention includes anomaly detection means and abnormal-time motor control means.

The anomaly detection means detects an anomaly of the motor current detection means. Namely, the anomaly detection means determines whether or not the motor current detection means is anomalous. When the anomaly of the motor current detection means is detected, instead of the normal-time motor control means, the abnormal-time motor control means controls the motor drive circuit. In order to prevent the followability of steering assist to steering operation from deteriorating, the abnormal-time motor control means includes an off-state-voltage detection section, a current-zero timing detection section, an energization time setting section, and a switching control section.

The off-state-voltage detection section detects the voltage generated between the terminals of the motor in a state in which the motor drive circuit is controlled such that no power supply voltage is applied between the terminals of the motor. For example, the off-state-voltage detection section detects the voltage generated between the terminals of the motor in a state in which the switching devices for normal rotation and the switching devices for reverse rotation are turned off. In the motor drive circuit, a reverse conducting diode (a diode through which current flows only in a direction opposite a direction in which current flows upon application of a voltage by a power supply apparatus) is provided in parallel with each switching device. Therefore, even when each switching device is turned off, current is likely to flow through the reverse conducting diode for a short period of time. In view of this, the current-zero timing detection section detects a timing at which the current flowing through the motor becomes zero on the basis of the voltage between the terminals of the motor detected by the off-state-voltage detection section. Namely, the current-zero timing detection section obtains a timing at which the current flowing through the motor is determined to be zero.

The energization time setting section sets an energization time corresponding to the steering torque detected by the steering torque detection means. The switching control section turns on the switching devices for normal rotation or the switching devices for reverse rotation for the energization time, set by the energization time setting section, every time the current-zero timing detection section detects the timing at which the current flowing through the motor becomes zero; i.e., every time the current flowing through the motor is detected to be zero.

Accordingly, in the present invention, the switching devices for normal rotation or the switching devices for reverse rotation are turned on for the set energization time every time the current flowing through the motor becomes zero. Therefore, the current flowing through the motor has a triangular waveform. Accordingly, the average of the current flowing through the motor can be controlled by the energization time. This energization time is set in accordance with the steering torque. As a result, the average current flowing through the motor can be controlled in accordance with the steering torque. Also, in the case where the average current is controlled in such a manner, even when the rotational speed of the motor increases, the average current decreases only slightly. Therefore, the followability of the steering assist is prevented from deteriorating, and adequate steering assist can be continued.

Another feature of the present invention resides in that the current-zero timing detection section detects, as the timing at which the current flowing through the motor becomes zero, at least one of a timing at which the voltage between the terminals of the motor is detected to assume a value between a positive-direction determination voltage level at which the flow direction of the current flowing through the motor can be determined as a positive direction and a negative-direction determination voltage level at which the flow direction of the current flowing through the motor can be determined as a negative direction, and a timing at which the voltage between the terminals of the motor is detected to have changed from the positive-direction determination voltage level to the negative-direction determination voltage level or have changed from the negative-direction determination voltage level to the positive-direction determination voltage level (S12 to 13, S50, S36, S40).

When the switching devices for normal rotation and the switching devices for reverse rotation are brought into the OFF state, the voltage between the terminals of the motor changes greatly depending on the rotational direction of the motor. If the voltage between the terminals of the motor has reached the positive-direction determination voltage level, it can be determined that current flows through the motor in the positive direction. If the voltage between the terminals of the motor has reached the negative-direction determination voltage level, it can be determined that current flows through the motor in the negative direction. The terms "positive direction" and "negative direction" are used so as to distinguish from each other the two flow directions of the current flowing through the motor, and any one of the two flow directions may be defined as the positive direction.

By making use of this, the current-zero timing detection section detects, as the timing at which the current flowing through the motor becomes zero, at least one of a timing at which the voltage between the terminals of the motor is detected to assume a value between the positive-direction determination voltage level and the negative-direction determination voltage level and a timing at which the voltage between the terminals of the motor is detected to have changed from the positive-direction determination voltage level to the negative-direction determination voltage level or to have changed from the negative-direction determination voltage level to the positive-direction determination voltage level. Accordingly, the timing at which the motor current becomes zero can be detected easily.

Notably, the positive-direction determination voltage level and the negative-direction determination voltage level can be calculated, for example, from the power supply voltage applied to the motor drive circuit and the voltage drops at the reverse conducting diodes provided in parallel to the switching devices.

Another feature of the present invention resides in that the switching control section selectively turns on the switching devices for normal rotation or the switching devices for reverse rotation in accordance with a rotational direction corresponding to the direction of the steering torque, for the energization time set by the energization time setting section (S17 to S20).

In the present invention, every time the timing at which the current flowing through the motor becomes zero is detected, the switching devices for normal rotation or the switching devices for reverse rotation selected in accordance with the rotational direction corresponding to the direction of the steering torque are turned on for the set energization time. For example, in the case where the steering torque is a torque acting in a leftward steering direction, every time the timing at which the current flowing through the motor becomes zero is detected, the switching devices (the switching devices for normal rotation or the switching devices for reverse rotation) which rotate the motor in the leftward steering direction are turned on for the set energization time corresponding to the magnitude of the steering torque. Accordingly, the average current flowing through the motor can be controlled in accordance with the magnitude of the steering torque by controlling the energization time of the switching devices corresponding to the direction of the steering torque.

Another feature of the present invention resides in that the energization time setting section individually sets the energization time of the switching devices for normal rotation and the energization time of the switching devices for reverse rotation in accordance with the steering torque detected by the steering torque detection means (S31 to S32), and, every time the timing at which the current flowing through the motor becomes zero is detected, the switching control section alternately turns on the switching devices for normal rotation and the switching devices for reverse rotation for the respective energization times set individually (S33 to S40).

In the case where a very small current is caused to flow through the motor (in the case where the steering torque is very small), the energization time becomes very short. If the period of vibration generated in the steering system becomes short due to the shortened energization time, there may arise a problem in that other components of the vehicle resonate with this vibration. In order to solve such a problem, in the present invention, the energization time setting section individually sets the energization time of the switching devices for normal rotation and the energization time of the switching devices for reverse rotation in accordance with the steering torque. For example, when the direction of the steering torque corresponds to the normal rational direction of the motor, the energization time of the switching devices for normal rotation is set to be longer than the energization time of the switching devices for reverse rotation, and when the direction of the steering torque corresponds to the reverse rational direction of the motor, the energization time of the switching devices for reverse rotation is set to be longer than the energization time of the switching devices for normal rotation.

Every time the timing at which the current flowing through the motor becomes zero is detected, the switching control section alternately turns on the switching devices for normal rotation and the switching devices for reverse rotation for the respective energization times set individually. Accordingly, current flows through the motor in the positive direction and the negative direction alternately. Thus, the average current can be controlled by adjusting the ratio between the energization time of the switching devices for normal rotation and the energization time of the switching devices for reverse rotation. Accordingly, even in the case where the steering torque is small, the period of the motor current having a triangular waveform can be increased. As a result, the period of vibration generated in the steering system can be set to be longer. Thus, the above-described problem of other components of the vehicle resonating with the vibration of the steering system can be solved.

Another feature of the present invention resides in that the electric power steering apparatus further comprises a rotational speed estimation section (S21) which operates, when the current-zero timing detection section detects the timing at which the current flowing through the motor becomes zero, so as to estimate the rotational speed of the motor on the basis of the voltage between the terminals of the motor detected by the off-state-voltage detection section before the switching devices for normal rotation or the switching devices for reverse rotation are turned on; and an energization time correction section (S22, S23) which corrects the energization time on the basis of the rotational speed of the motor estimated by the rotational speed estimation section such that in the case where the rotational speed is high, the energization time becomes longer as compared with the case where the rotational speed is low.

The above-described inventions can improve the followability of the steering assist to the steering operation; however since the required steering torque increases as the motor rotational speed increases, a driver may sense a sharp increase in steering torque during the steering operation. In order to overcome such a drawback, in the present invention, the rotational speed estimation section operates, upon detection of the timing at which the current flowing through the motor becomes zero, in order to estimate the rotational speed of the motor on the basis of the voltage between the terminals of the motor before the switching devices for normal rotation or the switching devices for reverse rotation are turned on. The voltage between the terminals of the motor at the time when no current flows through the motor is equal to the counter electromotive voltage. Accordingly, the rotational speed of the motor can be estimated by dividing the voltage between the terminals of the motor by a counter electromotive voltage constant.

The energization time correction section corrects the energization time such that in the case where the estimated rotational speed of the motor is high, the energization time becomes longer as compared with the case where the estimated rotational speed is low. As a result, according to the present invention, the sharp increase in steering torque that a driver senses during the steering operation can be reduced even when the rotational speed of the motor is high.

Another feature of the present invention resides in that an upper limit is set for the energization time, and the electric power steering apparatus further comprises a steering position detection section (S61) which detects steering position, and an upper limit change section (S62) which changes the upper limit of the energization time such that in the case where the steering position detected by the steering position detection section is close to a stroke end which mechanically defines an end of a steerable range, the upper limit decreases as compared with the case where the detected steering position is located away from the stroke end.

When the steering wheel is rotated quickly and the steering position reaches the stroke end, due to butting against a stopper (hereinafter referred to as "stopper butting"), the rotation of the motor stops suddenly. Therefore, the counter electromotive force of the motor disappears suddenly. As a result, the current flowing through the motor increases sharply, and a current surge may be generated. In order solve such a drawback, in the present invention, the steering position detection section detects the steering position, and when the steering position is close to the stroke end, the upper limit change section lowers the upper limit of the energization time. By virtue of this operation, the average current flowing through the motor is reduced before the stopper butting occurs. Therefore, even when the stopper butting occurs, the current surge can be suppressed. Also, in a situation where such stopper butting does not occur, the current limit of the motor is relaxed. As a result, the present invention can provide circuit protection and a sufficient degree of operation assist at the same time. Notably, the method of detecting the steering position is not limited to direct detection of steering angle, and the steering position may be estimated from other parameters representing the state of the vehicle.

Notably, in the above description, in order to facilitate understanding of the invention, symbols which are used in an embodiment and which are parenthesized are added to the constitution of the invention corresponding to the embodiment. However, the constituent elements of the invention are not limited to those in the embodiment denoted by the symbols.

BEST MODE FOR CARRYING OUT THE INVENTION

Figure 1:
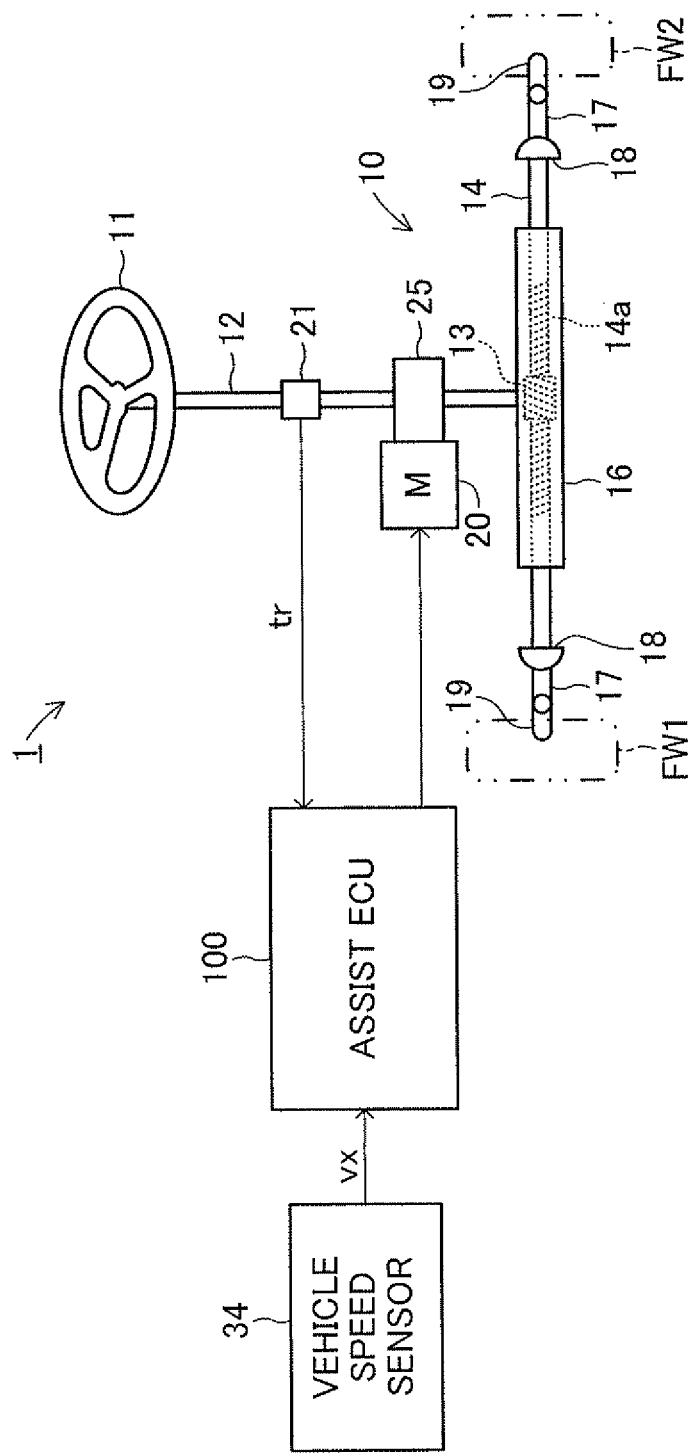
FIG. 1 is a schematic diagram of an electric power steering apparatus according to an embodiment of the present invention.

Hereinafter, an electric power steering apparatus according to an embodiment of the present invention will be described with reference to the drawings. FIG. 1 schematically shows the configuration of an electric power steering apparatus 1 for a vehicle according to the embodiment.

The electric power steering apparatus 1 includes, as main components, a steering mechanism 10 which steers steerable wheels in accordance with steering operation of a steering wheel 11; a motor 20 which is mounted in the steering mechanism 10 so as to generate steering assist torque; and an electronic control unit 100 which controls operation of the motor 20 in accordance with the operating state of the steering wheel 11. Hereinafter, the electronic control unit 100 will be referred to as an assist ECU 100.

The steering mechanism 10, which steers left and right front wheels FW1 and FW2 in accordance with rotational operation of the steering wheel 11, includes a steering shaft 12 whose upper end is connected to the steering wheel 11 for integral rotation therewith. A pinion gear 13 is connected to the lower end of the steering shaft 12 for integral rotation therewith. The pinion gear 13 is in meshing engagement with a gear section 14a formed on a rack bar 14, thereby constituting a rack-and-pinion mechanism in cooperation with the rack bar 14.

The gear section 14a of the rack bar 14 is accommodated in a rack housing 16, and the left and right ends of the rack bar 14 projecting from the rack housing 16 are connected to corresponding tie rods 17. Stoppers 18 determining stroke ends are formed at connection portions between the rack bar 14 and the tie rods 17. The stoppers 18 abut against the corresponding ends of the rack housing 16, thereby mechanically restricting the stroke of horizontal motion of the rack bar 14. The other ends of the left and right tie rods 17 are connected to knuckles 19 provided in the left and right front wheels FW1 and FW2. By virtue of the above-described configuration, the left and right front wheels FW1 and FW2 are steered leftward or rightward in accordance with an axial displacement of the rack bar 14, which results from rotation of the steering shaft 12 about its axis.

The motor 20 is assembled to the steering shaft 12 via a reduction gear 25. The motor 20 rotates so as to turn the steering shaft 12 around its axis via the reduction gear 25, to thereby apply assist force to the rotational operation of the steering wheel 11. This motor 20 is a brushed DC motor.

A steering torque sensor 21 is assembled to the steering shaft 12 such that it is disposed at an intermediate position between the steering wheel 11 and the reduction gear 25. The steering torque sensor 21 detects the torsion angle of a torsion bar (not shown) inserted, for example, in the intermediate section of the steering shaft 12 through use of a resolver, etc., and detects the steering torque tr applied to the steering shaft 12 from the detected torsion angle. The steering torque tr represents the direction in which the steering wheel 11 is rotated by its polarity (positive or negative). For example, the steering torque tr assumes a positive value when the steering wheel 11 is rotated to the left, and assumes a negative value when the steering wheel 11 is rotated to the right. Notably, in the present embodiment, the torsion angle of the torsion bar is detected by the resolver; however, it may be detected by another rotational angle sensor such as an encoder.

Next, the assist ECU 100 will be described with reference to FIG. 2. The assist ECU 100 includes an electric control circuit 50 which computes a target control quantity of the motor 20 and which outputs a switch drive signal corresponding to the computed target control quantity; and a motor drive circuit 40 which supplies electricity to the motor 20 in accordance with the switch drive signal received from the electric control circuit 50.

The electronic control circuit 50 includes a microcomputer 60 including a computation circuits (composed of a CPU, a ROM, a RAM, etc.) and an input/output interface; and a switch drive circuit 30 which amplifies the switch control signal received from the microcomputer 60 and which supplies the amplified switch control signal to the motor drive circuit 40.

The assist ECU 100 receives electricity from a power supply apparatus 200. This power supply apparatus 200 includes an unillustrated battery and an unillustrated alternator which generates electricity when an engine operates. The rated output voltage of the power supply apparatus 200 is set to, for example, 12 V. Notably, FIG. 2 shows only a power line 210 which supplies electricity from the power supply apparatus 200 to the motor drive circuit 40; however, electricity for operating the electric control circuit 50 is also supplied from the power supply apparatus 200.

The motor drive circuit 40 is provided between the power line 210 and a ground line 220, and is composed of an H-bridge circuit in which an upper arm circuit 45H (formed of a switching device Q1H and a switching device Q2H which are connected in parallel) and a lower arm circuit 45L (formed of a switching device Q1L and a switching device Q2L which are connected in parallel) are connected in series, and electricity supply lines 47a and 47b for supplying electricity to the motor 20 extend from connection portions A1 and A2 between the upper arm circuit 45H and the lower arm circuit 45L. Accordingly, one electricity supply terminal 20a of the motor 20 is connected to the power line 210 via the switching device Q1H, and is connected to the ground line 220 via the switching device Q1L. The other electricity supply terminal 20b of the motor 20 is connected to the power line 210 via the switching device Q2H, and is connected to the ground line 220 via the switching device Q2L.

MOS-FETs (Metal Oxide Semiconductor Field Effect Transistors) are used as the switching devices Q1H, Q2H, Q1L, and Q2L provided in the motor drive circuit 40. The switching devices Q1H, Q2H, Q1L, and Q2L are provided in the upper and lower arm circuits 45H and 45L such that a power supply voltage is applied between the source and drain of each switching device. In addition, the gate of each switching device is connected the switch drive circuit 30 of the electric control circuit 50.

Figure 2:
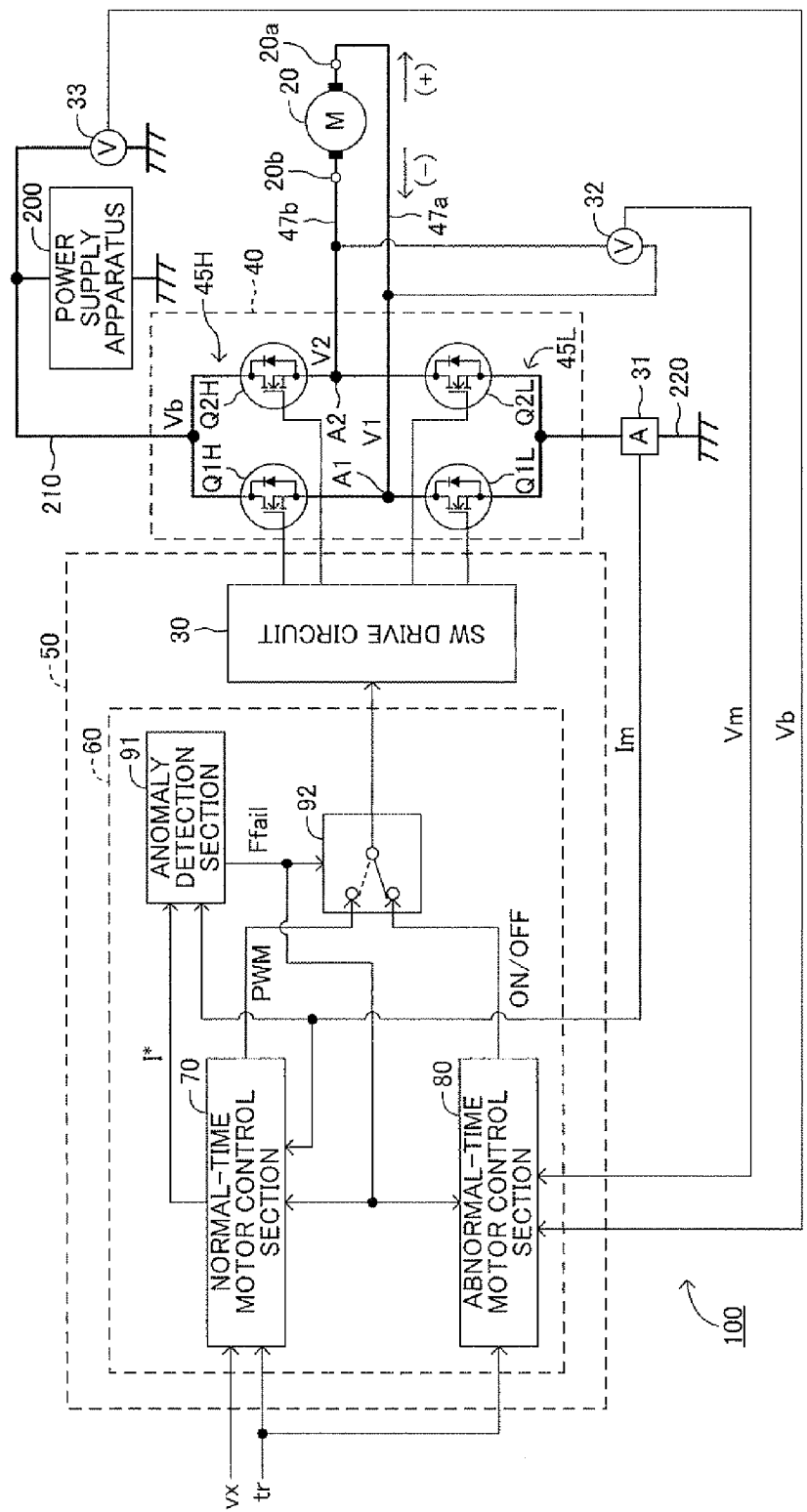
FIG. 2 is a functional block diagram of an assist ECU.

Notably, as indicated by circuit symbols in FIG. 2, each MOS-FET has a diode parasitically formed due to its structure. This diode is referred to as a parasitic diode. The parasitic diode of each of the switching devices Q1H, Q2H, Q1L, and Q2L is a reverse-conducting diode which blocks the current flow from the power line 210 toward the ground line 220, and permits only the current flow from the ground line 220 toward the power line 210. The motor drive circuit 40 may employ a configuration in which reverse-conducting diodes (diodes whose current block direction is the same as that of parasitic diodes, and conduct only in the reverse direction opposite the direction in which the power supply voltage is applied), which are different from parasitic diodes, are connected to the switching devices Q1H, Q2L, Q2H, Q1L in parallel.

The microcomputer 60 outputs, via the switch drive circuit 30, independent drive signals to the gates of the switching devices Q1H, Q2H, Q1L, and Q2L of the motor drive circuit 40. These drive signals turn the switching devices Q1H, Q2H, Q1L, and Q2L ON and OFF.

In the motor drive circuit 40, when the switching devices Q1H and Q2L are turned ON with the switching devices Q2H and Q1L held OFF, a current flows in the (+) direction shown in FIG. 2. As a result, the motor 20 generates a torque in the normal rotational direction. Meanwhile, when the switching devices Q2H and Q1L are turned ON with the switching devices Q1H and Q2L held OFF, a current flows in the (−) direction shown in FIG. 2. As a result, the motor 20 generates a torque in the reverse rotational direction. Accordingly, the switching devices Q1H and Q2L correspond to the switching devices for normal rotation of the present invention, and the switching devices Q2H and Q1L correspond to the switching devices for reverse rotation of the present invention.

The assist ECU 100 includes a current sensor 31 which detects the current flowing through the motor 20. The current sensor 31 is provided in the ground line 220, which connects the lower arm circuit 45L to the ground. The current sensor 31 having a shunt resistor (not shown) provided, for example, in the ground line 220 amplifies the voltage generated across the shunt resistor (not shown) through use of an amplifier (not shown), converts the amplified voltage to a digital signal through use of an A/D converter (not shown), and supplies the digital signal to the microcomputer 60. Hereinafter, the value of the current flowing through the motor 20 detected by the current sensor 31 will be referred to as a motor actual current Im. Notably, the current sensor 31 may be configured such that the function of amplifying the voltage signal and the function of converting the voltage signal to the digital signal are provided on the side of the microcomputer 60.

In addition, the assist ECU 100 includes a voltage sensor 32 which detects the inter-terminal voltage of the motor 20. This voltage sensor 32 converts the inter-terminal voltage of the motor 20 to a digital signal through use of an A/D converter (not shown), and supplies the digital signal to the microcomputer 60. Hereinafter, the value of the voltage detected by the voltage sensor 32 will be referred to as a motor voltage Vm. The motor voltage Vm corresponds to the difference (V1−V2) between a potential V1 (with respect to the ground level) at one connection portion A1 between the upper arm circuit 45H and the lower arm circuit 45L and a potential V2 (with respect to the ground level) at the other connection portion A2 therebetween. Notably, the voltage sensor 32 may be configured such that the function of converting the voltage signal to the digital signal is provided on the side of the microcomputer 60.

In addition, the assist ECU 100 includes a voltage sensor 33 which detects the power supply voltage supplied to the motor drive circuit 40; namely, the output voltage of the power supply apparatus 200. This voltage sensor 33 converts the voltage of the power line 210 to a digital signal through use of an A/D converter (not shown), and supplies the digital signal to the microcomputer 60. Hereinafter the value of the voltage detected by the voltage sensor 33 will be referred to as a power supply voltage Vb. Notably, the voltage sensor 33 may be configured such that the function of converting the voltage signal to the digital signal is provided on the side of the microcomputer 60.

In addition, a vehicle speed sensor 34 is connected to the assist ECU 100. The vehicle speed sensor 34 outputs to the assist ECU 100 a detection signal representing a vehicle speed vx.

Next, control processing performed by the microcomputer 60 will be described. The microcomputer 60 includes four functional blocks; i.e., a normal-time motor control section 70, an abnormal-time motor control section 80, an anomaly detection section 91, and a control changeover section 92. The microcomputer 60 realizes these functional sections by repeatedly executing control programs stored in the microcomputer 60 at predetermined intervals.

Figure 3:
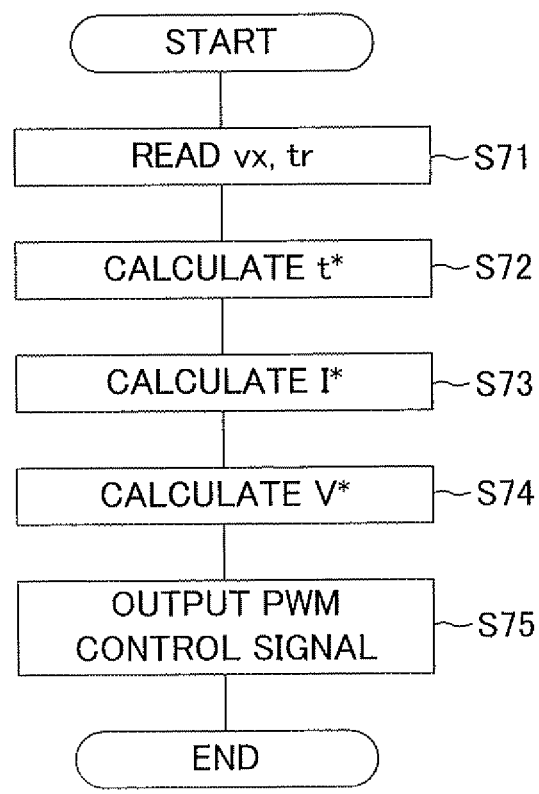
FIG. 3 is a flowchart showing a normal-time motor control routine.

The normal-time motor control section 70 is a functional block which drives and controls the motor 20 when no anomaly is detected in the current sensor 31; namely, at the normal time. Hereinafter, there will be described the processing performed by the normal-time motor control section 70. FIG. 3 shows a normal-time motor control routine executed by the normal-time motor control section 70.

When the present control routine starts, in step S71, the normal-time motor control section 70 first reads the vehicle speed vx detected by a vehicle speed sensor 22 and the steering torque tr detected by the steering torque sensor 21.

Figure 4:
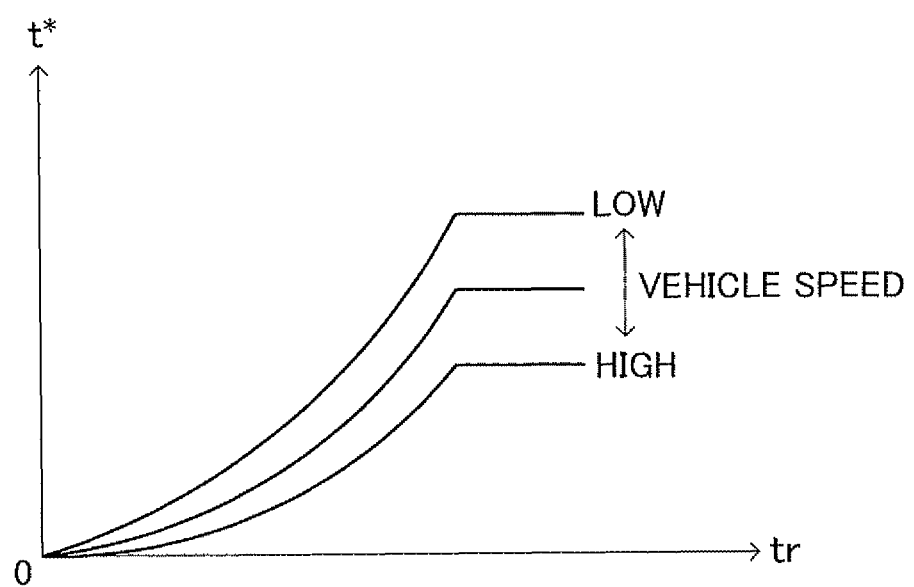
FIG. 4 is a graph showing an assist map.

Next, in step S72, by means of referring to an assist map shown in FIG. 4, the normal-time motor control section 70 calculates a target assist torque t* which is set in accordance with the read vehicle speed vx and steering torque tr. The assist map is relational data which represents the relation between the steering torque tr and the target assist torque t* for each of a plurality of representative vehicle speeds vx. The assist map has a property that the target assist torque t* increases with the steering torque tr, and the target assist torque t* increases as the vehicle speed decreases. Notably, FIG. 4 shows an assist map for leftward steering. In another map for rightward steering, the steering torque tr and the target assist torque t* have signs (i.e., negative signs) reverse to those in the assist map for leftward steering.

Next, in step S73, the normal-time motor control section 70 calculates a target current I* which is a current value required to generate the target assist torque t*. The target current I* is obtained by dividing the target assist torque t* by a torque constant. Next, in step S74, the normal-time motor control section 70 computes a deviation ΔI by subtracting a motor actual current Im detected by the current sensor 31 from the target current I*, and calculates a target command voltage V* such that the motor actual current Im follows the target current I* under PI control (proportional-integral control) performed by use of the deviation ΔI. For example, the target command voltage V* is calculated from the following expression.

$$V^* = Kp \cdot \Delta I + Ki \cdot \int \Delta I \, dt$$

In the expression given above, Kp represents the control gain of the proportional term for the PI control, and Ki represents the control gain of the integral term for the PI control.

Next, in step S75, the normal-time motor control section 70 outputs to the control changeover section 92 a PWM (Pulse Width Modulation) control signal corresponding to the target command voltage V*. After outputting the PWM control signal, the normal-time motor control section 70 ends the current execution of the normal-time motor control routine. Subsequently, the normal-time motor control section 70 repeatedly performs the above-described processing at predetermined intervals.

In the case where an anomaly determination signal Ffail output from the anomaly detection section 91 is "0," the control changeover section 92 outputs to the switch drive circuit 30 the PWM control signal output from the normal-time motor control section 70 as it is. In the case where the anomaly determination signal Ffail output from the anomaly detection section 91 is "1," the control changeover section 92 outputs to the switch drive circuit 30 the control signal output from the abnormal-time motor control section 80 as it is.

The switch drive circuit 30 amplifies the received control signal and outputs pulse trains corresponding to the control signal to the motor drive circuit 40. Thus, in the case where the anomaly determination signal Ffail output from the anomaly detection section 91 is "0," pulse trains whose duty ratios correspond to the target command voltage V* are output, as PWM control signals, to the motor drive circuit 40. By virtue of these PWM control signals, the duty ratios of the switching devices Q1H, Q2H, Q1L, and Q2L are controlled, whereby the drive voltage of the motor 20 is adjusted to the target command voltage V*. As a result, the target current I* flows through the motor 20 in a direction determined such that the motor 20 rotates in a direction corresponding to the direction of the steering operation. Thus, the motor 20 outputs a torque which is equal to the target assist torque t*, thereby assisting the steering operation performed by the driver.

The anomaly detection section 91 receives the motor actual current Im detected by the current sensor 31 and the target current I* calculated by the normal-time motor control section 70. In the case where the motor actual current Im differs greatly from the target current I* over a predetermined period of time, the anomaly detection section 91 determines that the current sensor 31 is faulty. For example, the anomaly detection section 91 calculates the deviation (|Im−I*|) between the motor actual current Im and the target current I*, and determines that the current sensor 31 is faulty in the case where a period of time during which the calculated deviation is continuously greater than a reference value set in advance becomes longer than a predetermined reference time.

In the case where a failure of the current sensor 31 is not detected, the anomaly detection section 91 sets the anomaly determination signal Ffail to "0." In the case where a failure of the current sensor 31 is detected, the anomaly detection section 91 sets the anomaly determination signal Ffail to "1." The anomaly detection section 91 outputs the set anomaly determination signal Ffail to the normal-time motor control section 70, the abnormal-time motor control section 80, and the control changeover section 92. The normal-time motor control section 70 continues its operation in the case where the anomaly determination signal Ffail is "0," and stops its operation in the case where the anomaly determination signal Ffail is "1." In contrast, the abnormal-time motor control section 80 continues its operation in the case where the anomaly determination signal Ffail is "1," and stops its operation in the case where the anomaly determination signal Ffail is "0."

The abnormal-time motor control section 80 is a functional block which drives and controls, as emergency measures, the motor 20 in the case where the current sensor 31 becomes faulty.

In the case where the motor 20 is to rotate in the normal direction, the abnormal-time motor control section 80 turns ON and OFF (repeatedly and alternately turns ON and OFF) the switching devices Q1H and Q2L with the switching devices Q2H and Q1L held OFF through use of the switch control signal to be output to the switch drive circuit 30. In contrast, in the case where the motor 20 is to rotate in the reverse direction, the abnormal-time motor control section 80 turns ON and OFF the switching devices Q2H and Q1L with the switching devices Q1H and Q2L held OFF. The abnormal-time motor control section 80 sets a singe-time ON time to a time corresponding to the steering torque tr. The singe-time ON time refers to a time over which the switching devices Q1H and Q2L or the switching devices Q2H and Q1L are held ON in each ON-OFF period. In addition, the abnormal-time motor control section 80 sets a timing at which the switching devices Q1H and Q2L or the switching devices Q2H and Q1L are turned ON to a point in time at which the current flowing through the motor 20 has becomes zero. Accordingly, the abnormal-time motor control section 80 controls the timing (current=0) at which the switching devices Q1H and Q2L or the switching devices Q2H and Q1L are turned ON and the single-time ON time.

As a result of performance of the above-described control, a current having a triangular waveform flows through the motor 20, and its average current can be adjusted to a desired value corresponding to the steering torque tr. Hereinafter, the current flowing through the motor 20 will be referred to the motor current I.

First, there will be described the method for determining that the motor current I has become zero when the current sensor 31 is faulty. In the case where the switching devices Q1H and Q2L are turned ON at the same time with the switching devices Q2H and Q1L held OFF, the potential V1 at the connection portion A1 is approximately equal to the power supply voltage Vb (V1≅Vb), and the potential V2 at the connection portion A2 is approximately equal to zero (V2≅0). In contrast, in the case where the switching devices Q2H and Q1L are turned ON at the same time with the switching devices Q1H and Q2L held OFF, the potential V1 at the connection portion A1 is almost zero (V1≅0), and the potential V2 at the connection portion A2 is approximately equal to the power supply voltage Vb (V2≅Vb).

In the case where all the switching devices Q1H, Q2L, Q2H, and Q1L are turned OFF at the same time, the potentials V1 and V2 are determined in accordance with the direction of the motor current I. That is, in the case where the current flows in the (+) direction shown in FIG. 2, the current is considered to flow through the parasitic diode of the switching device Q1L and the parasitic diode of the switching device Q2H. Accordingly, when the voltage drop at the parasitic diode is denoted by Vr, the potentials V1 and V2 are represented by the following expressions.

$V1 \cong 0-Vr$ $V2 \cong Vb+Vr$

Similarly, in the case where the current flows in the (−) direction shown in FIG. 2 when all the switching devices Q1H, Q2L, Q2H, and Q1L are turned OFF at the same time, the current is considered to flow through the parasitic diode of the switching device Q2L and the parasitic diode of the switching device Q1H. Accordingly, when the voltage drop at the parasitic diode is denoted by Vr, the potentials V1 and V2 are represented by the following expressions.

$V1 \cong Vb+Vr$ $V2 \cong 0-Vr$

In the case where the motor current I becomes zero in the state in which all the switching devices Q1H and Q2L, Q2H, and Q1L are held OFF, the inter-terminal voltage Vm (=V1−V2) of the motor 20 is equal to the counter electromotive voltage E generated by the motor 20.

Accordingly, by means of detecting the inter-terminal voltage Vm of the motor 20 by the voltage sensor 32 in the state in which all the switching devices Q1H, Q2L, Q2H, and Q1L are held OFF, the flow direction of the motor current I can be determined on the basis of the detected motor voltage Vm. That is, in the case where the motor voltage Vm (=V1−V2) detected by the voltage sensor 32 is approximately −(Vb+2Vr), the motor current I flows in the (+) direction. In the case where the motor voltage Vm is approximately (Vb+2Vr), the motor current I flows in the (−) direction. In the case where the motor voltage Vm is neither approximately −(Vb+2Vr) nor approximately (Vb+2Vr), it is determined that the motor current I is zero. Expressions for determining the direction of the motor current I are represented by the following expressions.

$Vm \cong -(Vb+2Vr) \ldots (+) \text{ direction}$ $Vm \cong (Vb+2Vr) \ldots (-) \text{ direction}$ $-(Vb+2Vr) < Vm < (Vb+2Vr) \ldots I=0$ In this case, the voltage drop Vr at the parasitic diode may be set to a fixed value corresponding to an expected voltage drop.

Notably, an ordinary H-bridge circuit is controlled such that, in order to prevent a short circuit between the upper arm circuit 45H and the lower arm circuit 45L, a dead time is provided when the direction in which electricity is supplied to the motor 20 is changed. During the dead time, all the switching devices Q1H, Q2L, Q2H, and Q1L are held OFF. Aside this dead time, in order to detect the inter-terminal voltage Vm of the motor 20, there is provided a period during which all the switching devices Q1H, Q2L, Q2H, and Q1L are held OFF.

By means of using the above-described principle, the abnormal-time motor control section 80 determines whether or not the motor current I is zero, and detects the timing at which the motor current I has become zero. Each time the abnormal-time motor control section 80 determines that the motor current I has become zero, it outputs an ON instruction signal for turning on the switching devices Q2H and Q1L or the switching devices Q1H and Q2L at the detected timing. The time during which the switching devices Q2H and Q1L or the switching devices Q1H and Q2L are held ON in each ON-OFF period is set in accordance with the magnitude |tr| of the steering torque tr. The time during which the switching devices Q2H and Q1L or the switching devices Q1H and Q2L are held ON in each ON-OFF period is referred to as the ON time T0.

After being turned ON by the drive signals, the switching devices Q2H and Q1L or the switching devices Q1H and Q2L are turned OFF again when the ON time T0 lapses. Accordingly, the motor current I has a triangular waveform. The abnormal-time motor control section 80 sets the ON time T0 to a time corresponding to the steering torque tr. As a result, a current corresponding to the steering torque tr flows through the motor 20, whereby the motor 20 generates an appropriate steering assist torque.

Figure 5:
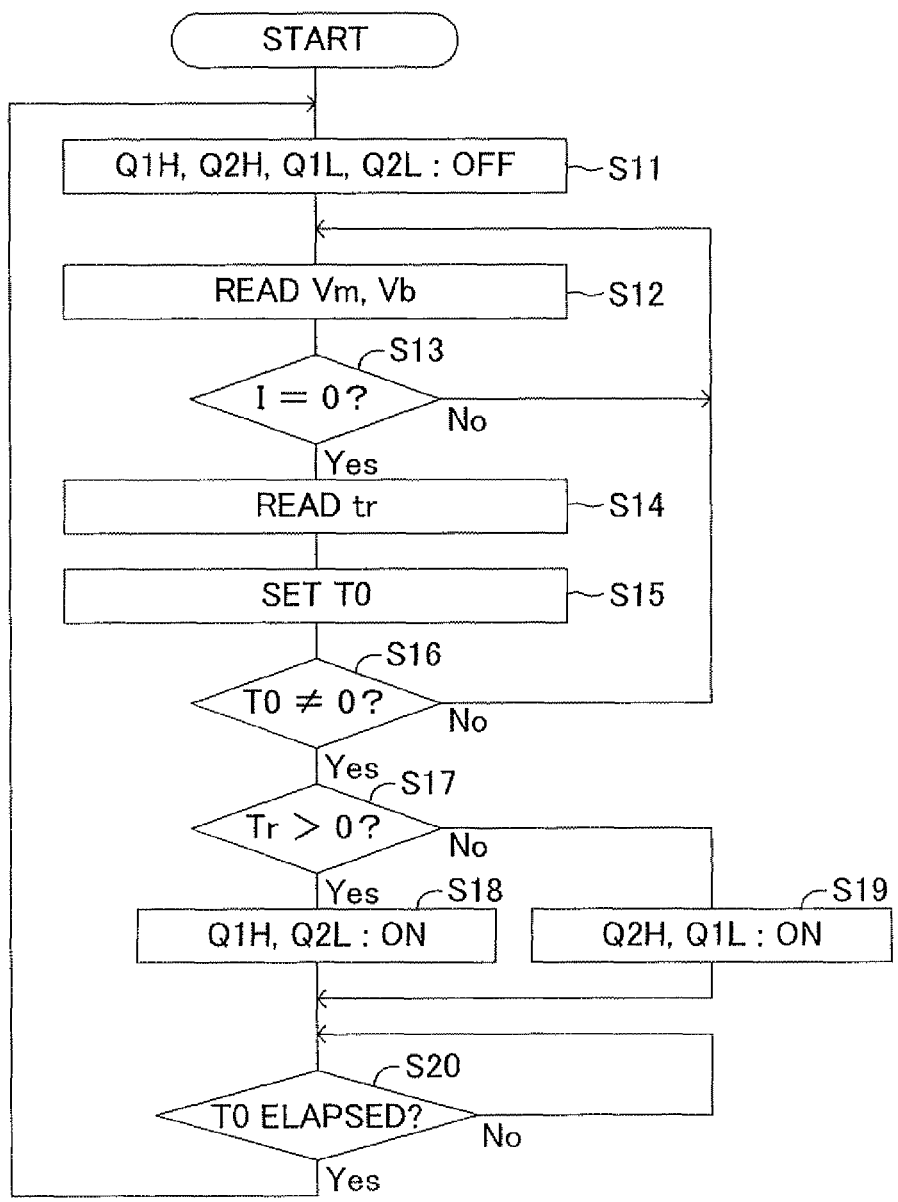
FIG. 5 is a flowchart showing an abnormal-time motor control routine.

Next, there will be described an abnormal-time motor control routine executed by the abnormal-time motor control section 80. FIG. 5 is a flowchart showing the abnormal-time motor control routine. The abnormal-time motor control routine starts when the anomaly determination signal Ffail output from the anomaly detection section 91 changes from "0" to "1."

When the abnormal-time motor control routine starts, in step S11, the abnormal-time motor control section 80 first outputs an OFF instruction signal for turning OFF all the switching devices Q1H, Q2L, Q2H, and Q1L. Thus, the switching devices Q1H, Q2L, Q2H, and Q1L of the motor drive circuit 40 are turned OFF. Next, in step S12, the abnormal-time motor control section 80 reads the motor voltage Vm detected by the voltage sensor 32 and the power supply voltage Vb detected by the voltage sensor 33.

Next, in step S13, the abnormal-time motor control section 80 determines whether or not the motor current I has become zero. As mentioned above, the direction of the motor current I can be determined from the motor voltage Vm (=V1−V2)

detected by the voltage sensor 32. In this example, since the power supply voltage Vb is included in the expression for determining the direction of the current, the abnormal-time motor control section 80 reads the power supply voltage Vb detected by the voltage sensor 33. However, if the power supply voltage Vb is considered to be fixed, the step for reading the power supply voltage Vb may be omitted.

If the motor current I is zero, the abnormal-time motor control section 80 proceeds to step S14. If the motor current I is not zero, the abnormal-time motor control section 80 returns to step S12, to thereby wait until the motor current I becomes zero. The abnormal-time motor control section 80 determines, on the basis of the motor voltage Vm, that the motor current I has become zero in any one of the three cases, i.e., a case where the abnormal-time motor control section 80 has determined by the above-described expression for determination that the motor voltage Vm falls within the range where the motor current I becomes zero (−Vb+2Vr)<Vm<(Vb+2Vr)), a case where the abnormal-time motor control section 80 has determined that the direction of the motor current I has changed from the (+) direction to the (−) direction, and a case where the abnormal-time motor control section 80 has determined that the direction of the motor current I has changed from the (−) direction to the (+) direction.

Each time the abnormal-time motor control section 80 performs the loop processing of steps S12 and S13, it memorizes the direction of the motor current I determined on the basis of the motor voltage Vm. Subsequently, the abnormal-time motor control section 80 compares the direction of the motor current I detected during the preceding loop processing with the direction of the motor current I detected during the current loop processing, and determines that the motor current I has become zero even in the case where the direction of the motor current I has changed. By virtue of this, even if the motor voltage Vm does not satisfy the expression for determination (−(Vb+2Vr)<Vm<(Vb+2Vr)), the abnormal-time motor control section 80 can reliably detect the timing at which the motor current I becomes zero on the basis of the change of the direction of the motor current I. In this case, since the polarity (positive or negative) of the motor voltage Vm differs in accordance with the direction of the motor current I and the absolute value of the motor voltage Vm is large if the motor current I is not zero, the abnormal-time motor control section 80 can easily detect the reversal of the direction of the motor current I. Notably, the abnormal-time motor control section 80 may determine that the motor current I has become zero only when the motor voltage Vm satisfies the expression for determination (−(Vb+2Vr)<Vm<(Vb+2Vr)) without detecting the reversal of the direction of the motor current I.

Figure 6:
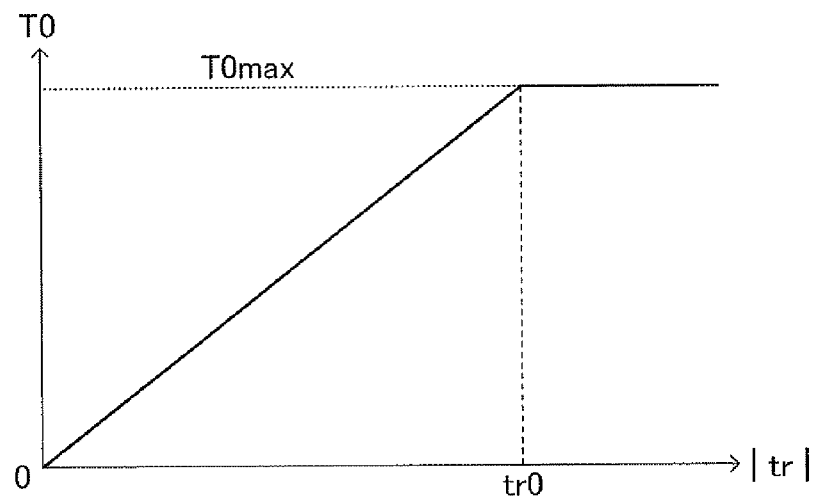
FIG. 6 is a graph showing an on-time setting map.

If the abnormal-time motor control section 80 determines, through repetition of the above-described loop processing, that the motor current I has become zero (S13: Yes), it proceeds to step S14 in order to read the steering torque tr detected by the steering torque sensor 21. Next, in step S15, the abnormal-time motor control section 80 sets, on the basis of the steering torque tr, the ON time T0 during which the switching devices Q2H and Q1L or the switching devices Q1H and Q2L are held ON in each ON-OFF period. The abnormal-time motor control section 80 stores the on-time setting map shown in FIG. 6, and sets the ON time T0 corresponding to the steering torque tr with reference to this on-time setting map. The on-time setting map has a property that the ON time T0 increases with the magnitude |tr| of the steering torque tr. The ON time T0 has a predetermined upper limit T0max such that it is set to the upper limit T0max in the case where the magnitude |tr| of the steering torque tr is tr0 or more. Notably, the map used for determining the ON time T0 is not limited to the map which provides the ON time T0 which changes in proportional to the magnitude |tr| of the steering torque tr as shown in FIG. 6. The map used for determining the ON time T0 may be a map (mp1) which represents the relation between the magnitude |tr| of the steering torque tr and the ON time T0 by a bent line having a plurality of bent points or a map (mp2) which represents the relation between the magnitude |tr| of the steering torque tr and the ON time T0 by a curve determined by a polynomial.

Next, in step S16, the abnormal-time motor control section 80 determines whether or not the ON time T0 is zero. In the case where the ON time T0 is zero; i.e., in the case where the magnitude |tr| of the steering torque tr is zero, the abnormal-time motor control section 80 returns to step S12.

In the case where the ON time T0 is not zero, in step S17, the abnormal-time motor control section 80 checks the polarity (positive or negative) of the steering torque tr. In the case where the steering torque tr assumes a positive value; i.e., in the case where a leftward steering torque tr is detected, in step S18, the abnormal-time motor control section 80 outputs an ON instruction signal for turning ON the switching devices Q1H and Q2L. In the case where the steering torque tr assumes a negative value; i.e., a rightward steering torque tr is detected, in step S19, the abnormal-time motor control section 80 outputs an ON instruction signal for turning ON the switching devices Q2H and Q1L. As a result, the switching devices Q1H and Q2L or the switching devices Q2H and Q1L of the motor drive circuit 40 are turned ON, whereby the current supplied from the power supply apparatus 200 starts flowing through the motor 20.

After outputting the ON instruction signal in step S18 or S19, in step S20, the abnormal-time motor control section 80 counts the time elapsed since the ON instruction signal was output, and waits until the elapsed time reaches the ON time T0. When the elapsed time reaches the ON time T0, the abnormal-time motor control section 80 returns to step S11. Accordingly, all the switching devices Q1H, Q2L, Q2H, and Q1L are turned OFF, thereby interrupting the supply of electricity from the power supply apparatus 200 to the motor 20. As a result, the motor current I starts to decrease. When the motor current I reaches zero (S13: Yes), electricity is supplied to the motor 20 for the ON time T0 corresponding to the magnitude |tr| of the steering torque tr.

As a result of repetition of the above-described processing, each time the motor current I is detected to have become zero, the switching devices Q2H and Q1L or the switching devices Q1H and Q2L are turned ON at that timing. Therefore, the motor current I has a triangular waveform shown in FIG. 8, and its average corresponds to the magnitude |tr| of the steering torque tr. As mentioned above, by means of adjusting the single-time ON time of the switching devices Q2H and Q1L or the switching devices Q1H and Q2L in accordance with the magnitude |tr| of the steering torque tr, the abnormal-time motor control section 80 controls the average current flowing through the motor 20. Thus, the motor 20 generates a steering assist torque corresponding to the steering torque tr.

Notably, immediately after start of the abnormal-time motor control routine, the abnormal-time motor control section 80 may supply electricity to the motor 20 in such a direction that the absolute value of the motor current I decreases, when the abnormal-time motor control section 80 waits in step S13 until the motor current I becomes zero. That is, in the case where the motor current I is flowing in the (+) direction, the abnormal-time motor control section 80 may turn ON the switching devices Q2H and Q1L in order to forcedly decrease the current flowing in the (+) direction. In the case where the motor current I is flowing in the (−) direction, the abnormal-time motor control section 80 may turn ON the switching devices Q1H and Q2L in order to forcedly decrease the current flowing in the (−) direction, to thereby shorten the wait time.

Figure 8:
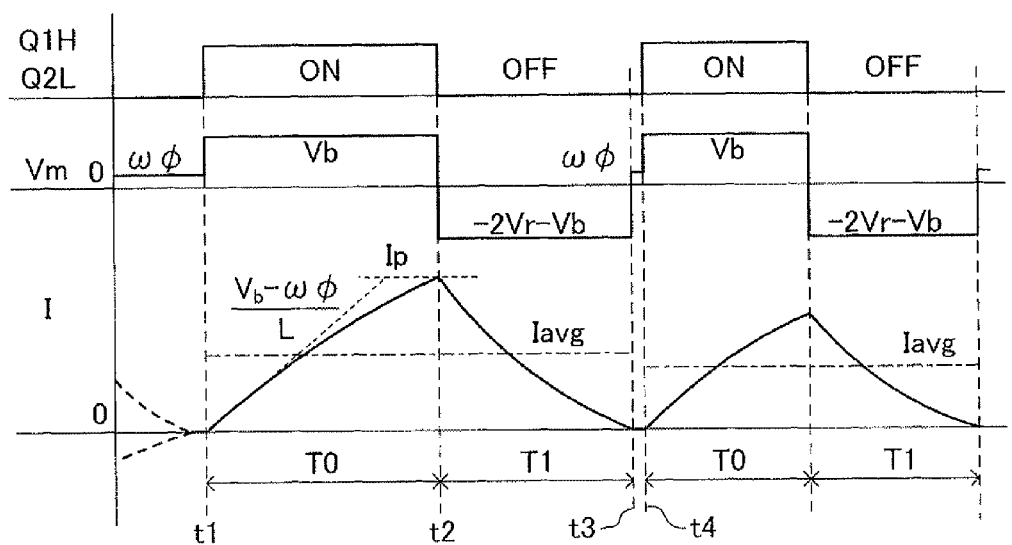
FIG. 8 is a graph showing changes in a switch command signal, motor voltage Vm, and motor current I.

FIG. 8 is a graph showing changes in the switch command signal, the motor voltage Vm, and the motor current I for the case where the abnormal-time motor control routine is executed. This graph shows an example of the case where the motor 20 is driven in the normal direction. The abnormal-time motor control section 80 waits until the motor current I is detected to have become zero. Upon determining that the motor current I has become zero at time t1, the abnormal-time motor control section 80 turns ON the switching devices Q1H and Q2L which have been held OFF. As a result, the motor current I starts to flow in the (+) direction. The rate of increase of the current I at the time when it starts to flow can be approximated by an expression (Vb−ωφ))/L. In this expression, ω represents the rotational speed of the motor 20, φ represents the counter electromotive voltage constant of the motor 20, L represents the motor inductance, and ωφ represents the counter electromotive voltage generated by the motor 20.

When the ON time T0 elapses since the switching devices Q1H and Q2L were turned ON, the switching devices Q1H and Q2L are turned OFF (time t2). As a result, the motor current I starts to decrease and finally becomes zero, or its direction changes to the (−) direction (time t3). At the timing (time t4) at which the abnormal-time motor control section 80 determines that the motor current I has become zero, it supplies electricity again to the motor 20 for the ON time T0 corresponding to the magnitude |tr| of the steering torque tr. Thus, a current having a triangular waveform flows through the motor 20.

In FIG. 8, T1 represents the period from time t2 to time t3. The ON time T0 can be set arbitrarily; however, the period T1 is determined on the basis of the circuit equation for the motor 20. Meanwhile, the average of the motor current I (referred to as average current $I_{avg}$) is about half the peak value Ip in each period during which electricity is supplied to the motor 20. Accordingly, by means of adjusting the ON time T0, the average current $I_{avg}$ flowing through the motor 20 can be adjusted. In addition, by means of increasing the ON time T0 with the magnitude |tr| of the steering torque tr, the average current $I_{avg}$ which is proportional to the magnitude |tr| of the steering torque tr can be caused to flow through the motor 20.

Notably, the ON time T0 is set to, for example, several milliseconds. Considering the PWM carrier frequency of the normal-time motor control section 70 is, for example, 20 kHz, the ON time T0 is far longer than the single-time ON time of the PWM control signal.

In the case where current is caused to intermittently flow through the motor 20 as mentioned above, there is a possibility that the motion of the steering wheel 11 becomes vibratory. However, by means of supplying electricity to the motor 20 several times or more a second, the vibration can be reduced by virtue of the inertia of the motor 20 and that of the steering wheel 11. Accordingly, the electric power steering apparatus can assist steering operation while mitigating unnatural sensation.

Hereunder, the followability of the steering assist to the steering operation; namely, the steering assist performance provided when the steering operation is performed at high speed, for the case where the abnormal-time motor control section 80 drives and controls the motor 20 will be described in contrast with the conventional apparatus. First, the conventional apparatus will be described. In the conventional apparatus proposed in Patent Document 1, open loop control is performed when the current sensor is faulty. Accordingly, when a target current Iref is given, the output voltage V corresponding thereto is calculated in accordance with the following expression (1).

$$V = RI_{ref} + L\frac{dI_{ref}}{dt} \tag{1}$$

However, actually, the current I flows in accordance with the following expression (2) which includes a term representing the counter electromotive voltage.

$$V = RI + L\frac{dI}{dt} + \omega\phi \tag{2}$$

Accordingly, the ratio between the target current Iref and the actual current I is calculated in accordance with the following expression (3). Notably, since the change in the current is negligible, dI/dt is considered to be 0 (dI/dt=0).

$$\frac{I}{I_{ref}} = \frac{V - \omega\phi}{V} \tag{3}$$

Figure 9:
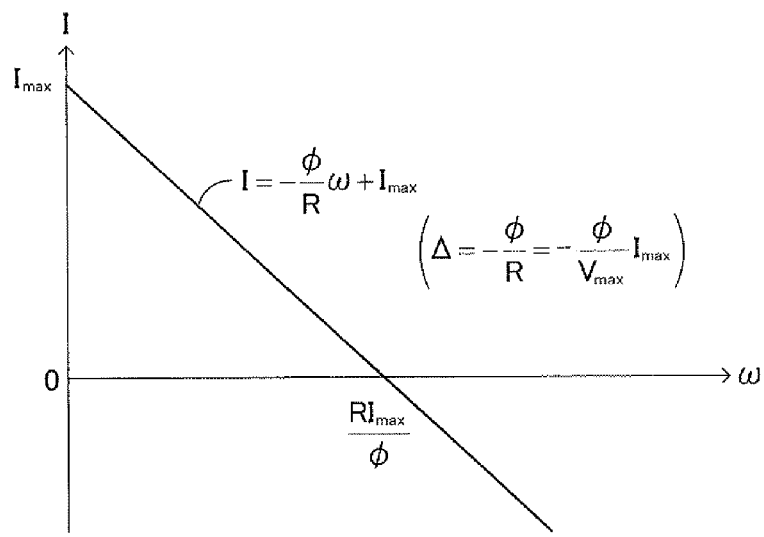
FIG. 9 is a graph showing the relation between motor rotational speed ω and actual current I in the case of open loop control of a conventional apparatus.

The expression given above shows that the actual current I becomes equal to the target current Iref if the rotational speed ω of the motor 20 is zero (ω=0); however, the actual current I decreases as the rotational speed ω increases, and a force for braking the motor 20 is generated if the counter electromotive voltage ωφ exceeds the output voltage V. The characteristic of the above-described open loop control is shown in FIG. 9. FIG. 9 shows the relation between the rotational speed ω and the actual current I. The actual current I is represented by the expression (4) given below. In this expression, Imax represents the maximum current that can be supplied to the motor 20 by the motor drive circuit 40, and is determined on the basis of the specifications of the switching devices Q1H, Q2L, Q2H, and Q1L. Hereinafter, Imax will be referred to as the maximum current Imax. The maximum current Imax is set to, for example, 50 amperes.

$$I = -\frac{\phi}{R}\omega + I_{max} \tag{4}$$

If the slope of the line represented by the above-described linear function is considered to be Δ, Δ can be represented by the expression (5) give below. In this expression, Vmax represents the value (Imax×R) calculated by multiplying the maximum current Imax by the internal resistance R of the motor 20. Hereinafter, Vmax will be referred to as the maximum voltage Vmax. If the internal resistance R of the motor 20 is considered to be, for example, 0.1Ω, the maximum voltage Vmax is set to 5 volt (50 A×0.1Ω).

$$\Delta = -\frac{\phi}{R} = -\frac{\phi}{V_{max}}I_{max} \tag{5}$$

The counter electromotive voltage can be estimated from the rotational speed of the motor 20; however, in general, a brushed motor is not provided with a rotational angle sensor or a rotational speed sensor. Accordingly, the counter electromotive voltage cannot be estimated when the open loop control is performed in the case where the current sensor is faulty.

Next, there will be described the ω-I characteristic controlled by the abnormal-time motor control section 80 of the present embodiment. If the above-described motor voltage expression (2) for calculating the motor voltage is solved, the motor current I is represented by the following expression (6).

$$I = \frac{V_b - \omega\phi}{R}\left(1 - \exp\left(-\frac{R}{L}t\right)\right) \approx \frac{V_b - \omega\phi}{L}t \quad (6)$$

In the expression given above, in order to simplify calculation, the exponential function is approximated by the slope at the time when t is zero (t=0).

As mentioned above, in the case where electricity is intermittently supplied to the motor 20, the motor current I has a triangular waveform as shown in FIG. 8. Accordingly, about half the peak current Ip becomes an average current Iavg. By means of substituting the ON time T0 into the expression (6) given above, the average current Iavg is represented by the following expression (7).

$$I_{avg} = \frac{I_p}{2} = \frac{V_b - \omega\phi}{2L}T_0 \quad (7)$$

As can be understood from the expression (7) given above, the average current Iavg increases with the ON time T0. However, the maximum value of the ON time T0 must satisfy a condition that overcurrent does not occur even if the counter electromotive voltage becomes zero due to sudden stop of the motor 20. That is, it is necessary to prevent the peak current Ip from exceeding the maximum current Imax permitted for the motor drive circuit 40. Accordingly, the upper limit T0max of the ON time T0 is represented by the following expression (8).

$$T_{0max} = \frac{L \cdot I_{max}}{V_b} \quad (8)$$

Accordingly, the average current Iavg can be represented by the following expression (9).

$$I_{avg} = -\frac{\phi \cdot I_{max}}{2V_b}\omega + \frac{1}{2}I_{max} \quad (9)$$

Figure 10:
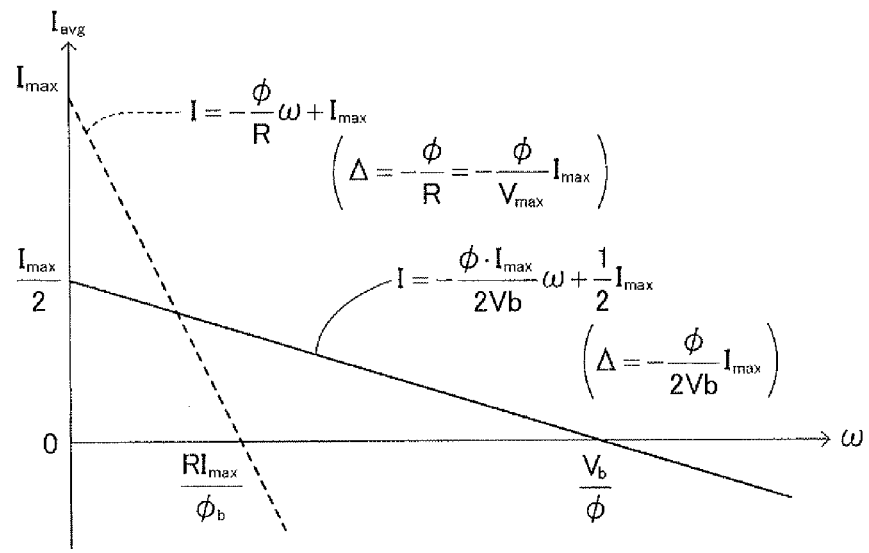
FIG. 10 is a graph showing the relation between motor rotational speed ω and average current Iavg in the present embodiment.

FIG. 10 shows the ω-Iave characteristic (the relation between the motor rotational speed ω and the average current Iave) of the apparatus of the present embodiment. In FIG. 10, in order to compare with the ω-I characteristic of the conventional apparatus, the characteristic of the conventional apparatus is represented by a broken line, and the characteristic of the apparatus of the present embodiment is represented by a solid line. Hereunder, the slopes A of the lines represented by two linear functions will be compared. The slope of the line represented by the linear function according to the present embodiment is represented by the following expression (10).

$$\Delta = -\frac{\phi}{2V_b}I_{max} \quad (10)$$

When the slope Δ(=−φ·Imax/Vmax) of the line representing the characteristic of the conventional apparatus is compared with the slope Δ(=−·Imax/2Vb) of the line representing the characteristic of the apparatus of the present embodiment, the latter slope Δ is smaller than the former slope Δ because the denominator of the expression representing the latter slope Δ is larger than that of the former slope. In an ordinary electric power steering apparatus, the maximum voltage Vmax is smaller than the power supply voltage Vb. For example, in the case where Vmax=5 V and Vb=12 V, the slope Δ representing the characteristic of the apparatus of the present embodiment is about ⅕ the slope Δ representing the characteristic of the conventional apparatus. Therefore, according to the present embodiment, a decrease in the output current can be suppressed even if the motor rotational speed ω increases.

According to the above-described electric power steering apparatus 1 of the present embodiment, in the case where the current sensor 31 fails, the functional block for driving and controlling the motor 20 is switched from the normal-time motor control section 70 to the abnormal-time motor control section 80. The abnormal-time motor control section 80 detects the motor voltage Vm in the state where all the switching devices Q1H, Q2L, Q2H, and Q1L of the motor drive circuit 40 are held OFF, and detects the state where the motor current I becomes zero on the basis of the detected motor voltage Vm. Each time the abnormal-time motor control section 80 detects that the motor current I has become zero, it turns ON the switching devices Q1H and Q2L (in the case of normal rotation) or the switching devices Q2H and Q1L (in the case of reverse rotation) at that timing for the ON time T0 which is set in accordance with the steering torque tr.

As a result, a current having a triangular waveform flows through the motor 20 intermittently. In this case, since the ON time T0 is set such that it increases with the magnitude |tr| of the steering torque tr, the average current Iavg flowing through the motor 20 also increases with the magnitude |tr| of the steering torque tr. Even in the case where insufficiency of steering assist occurs because the current flowing through the motor 20 is less than the originally required current, the steering torque increases due to the insufficiency of steering assist, whereby the ON time T0 increases.

In addition, as can be understood from the current characteristic (FIG. 10), even in the case where the motor rotational speed ω increases, the degree of the resultant decrease in the output current is small.

As a result, according to the electric power steering apparatus 1 of the present embodiment, even in the case where the current sensor 31 fails, the desired steering assist corresponding to the steering torque tr can be obtained. In addition, reduction in the steering assist can be suppressed even in the case where the steering operation is performed quickly. That is, the followability of the steering assist to the steering operation can be improved. Thus, impairment of the steering feel can be suppressed.

<First Modification>

In the above-described embodiment, in the case where a very small current is caused to flow through the motor 20, the ON time T0 becomes very short, and the period of vibration generated in the steering system (the motor 20 and the steering mechanism 10) becomes very short accordingly. When the period of vibration becomes short, there may arise a problem in that other components of the vehicle resonate with this vibration. In order to solve this problem, in a first modification, a very small current can be caused to flow through the motor 20 without rendering the ON time T0 extremely short.

In the first modification, current is caused to flow through the motor 20 in the (+) direction and the (−) direction alternately, and the average current Iavg flowing through the motor 20 is controlled by adjusting the ratio of the time during which the current flows in the (+) direction to the time during which the current flows in the (−) direction. In the first modification, all of the four switching devices Q1H, Q2L, Q2H, and Q1L are momentarily held OFF only in the period during which the direction of the motor current I is detected. However, basically, either of a pair of the switching devices Q1H and Q2L or a pair of the switching devices Q2H and Q1L are held ON.

Figure 11:
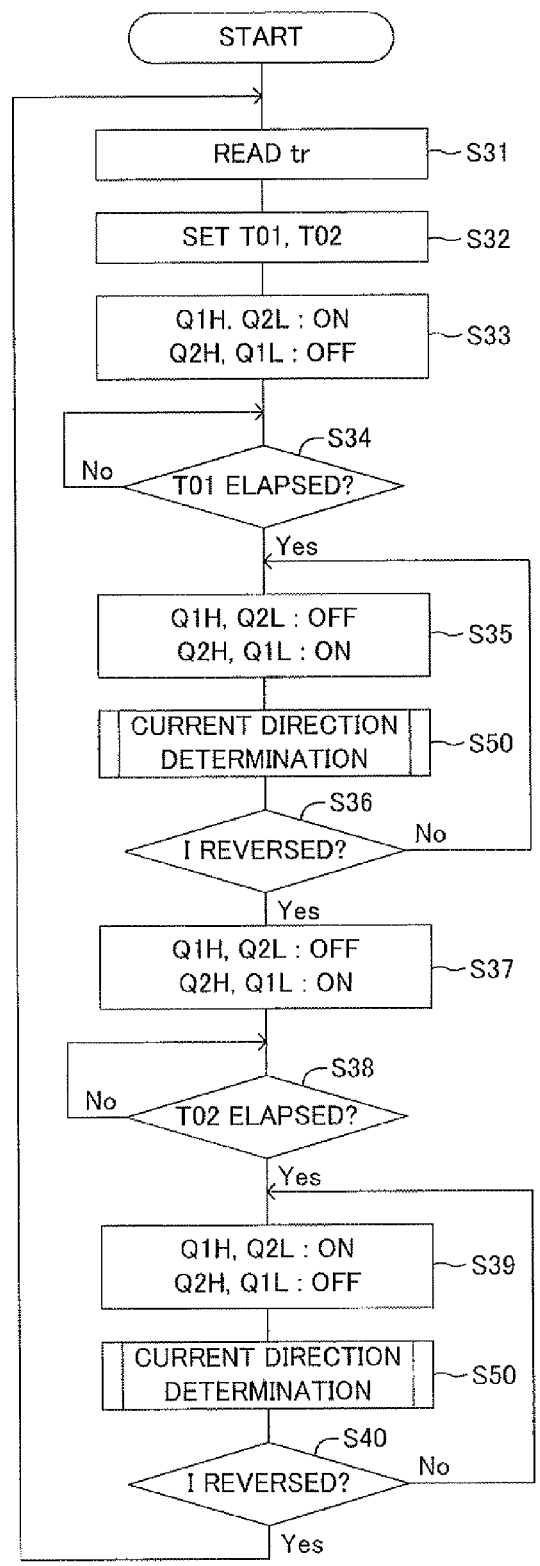
FIG. 11 is a flowchart showing an abnormal-time motor control routine according to a first modification.

In the first modification, only the processing performed by the abnormal-time motor control section 80 differs from that of the above-described embodiment. The remaining configuration is the same as that of the above-described embodiment. Hereinafter, there will be described the processing performed by the abnormal-time motor control section 80. FIG. 11 is a flowchart showing an abnormal-time motor control routine according to the first modification which is executed by the abnormal-time motor control section 80.

When the abnormal-time motor control routine according to the first modification starts, in step S31, the abnormal-time motor control section 80 first reads the steering torque tr detected by the steering torque sensor 21. Next, in step S32, on the basis of the steering torque tr, the abnormal-time motor control section 80 sets a normal-direction ON time T01 for adjusting the time during which current is caused to flow in such a direction that the motor 20 rotates in the normal direction; and a reverse-direction ON time T02 for adjusting the time during which current is caused to flow in such a direction that the motor 20 rotates in the reverse direction.

Figure 12:
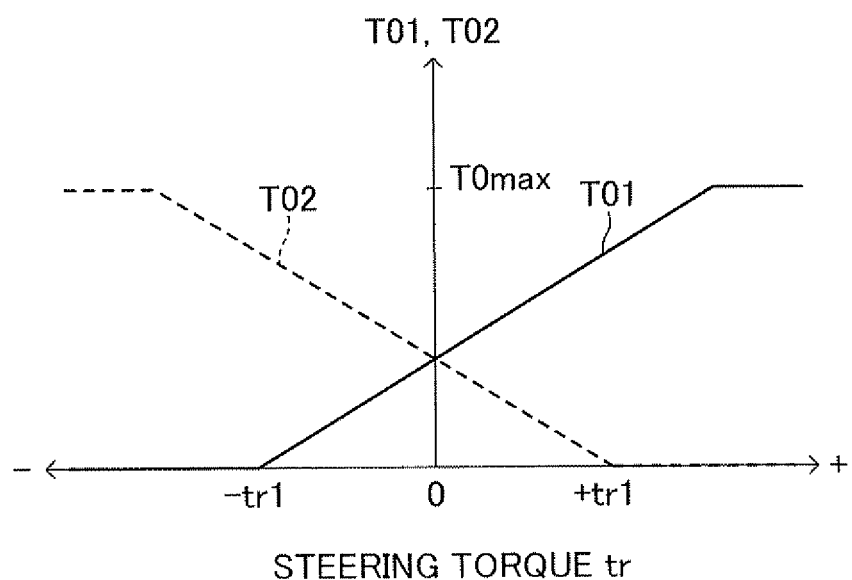
FIG. 12 is a graph showing an on-time setting map according to the first modification.

The abnormal-time motor control section 80 stores an on-time setting map shown in FIG. 12, and sets the normal-direction ON time T01 and the reverse-direction ON time T02 with reference to this on-time setting map. The on-time setting map has a property that the normal-direction ON time T01 is longer than the reverse-direction ON time T02 in the case where the steering torque tr assumes a positive value, and the reverse-direction ON time T02 is longer than the normal-direction ON time T01 in the case where the steering torque tr assumes a negative value. In the case where the steering torque tr is zero, the abnormal-time motor control section 80 sets the normal-direction ON time T01 and the reverse-direction ON time T02 to the same value. In addition, the abnormal-time motor control section 80 sets the normal-direction ON time T01 to a value which increases with the steering torque tr within the range where the steering torque tr is greater than a predetermined negative value −tr1, and sets it to zero within the range where the steering torque tr is equal to or less than the predetermined negative value −tr1. The abnormal-time motor control section 80 sets the reverse-direction ON time T02 to a value which increases as the steering torque tr decreases (increase in the negative direction) within the range where the steering torque tr is less than a predetermined positive value +tr1, and sets it to zero within the range where the steering torque tr is equal to or greater than the predetermined positive value +tr1. In addition, an upper limit T0max is set for both the normal-direction ON time T01 and the reverse-direction ON time T02.

Next, in step S33, the abnormal-time motor control section 80 outputs the ON instruction signal for turning ON the switching devices Q1H and Q2L and the OFF instruction signal for turning OFF the switching devices Q2H and Q1L. As a result, the current supplied from the power supply apparatus 200 starts to flow through the motor 20 in the (+) direction. Notably, when this routine starts, all the switching devices Q1H, Q2L, Q2H, and Q1L are held OFF.

Next, in step S34, the abnormal-time motor control section 80 starts counting time, and waits until the time elapsed after output of the instruction signals to the switching devices Q1H, Q2L, Q2H, and Q1L reaches the normal-direction ON time T01. During this period, there increases the current flowing through the motor 20 in the (+) direction. After detecting elapse of the normal-direction ON time T01 (S34: Yes), in step S35, the abnormal-time motor control section 80 outputs the OFF instruction signals for turning OFF the switching devices Q1H and Q2L and the ON instruction signals for turning ON the switching devices Q2H and Q1L. That is, the abnormal-time motor control section 80 outputs instruction signals for inverting the states of the switching devices Q1H, Q2L, Q2H, and Q1L such that a current flows through the motor 20 in a direction opposite the direction in which the current has been flowing. As a result, the motor current I which has been increasing in the (+) direction starts to decrease.

Figure 13:
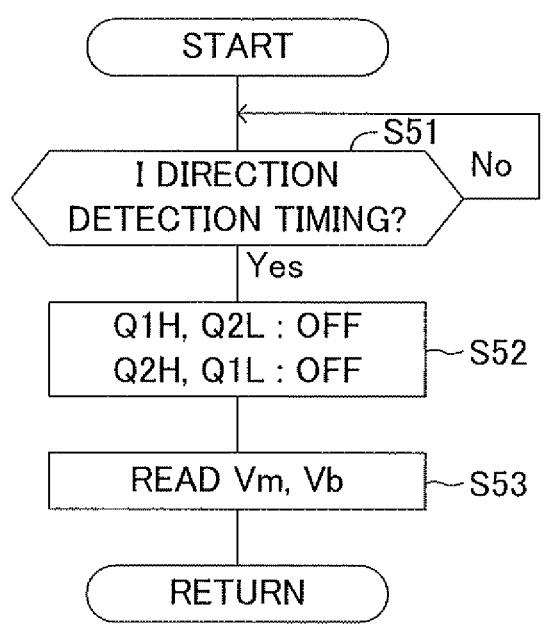
FIG. 13 is a flowchart showing current direction determination processing (subroutine) according to the first modification.

Next, in step S50, the abnormal-time motor control section 80 performs current direction determination processing. FIG. 13 shows a subroutine representing this current direction determination processing. When the current direction determination processing starts, the abnormal-time motor control section 80 first determines whether or not now is the timing to detect the flow direction of the motor current I. In the first modification, the abnormal-time motor control section 80 estimates that the motor current I is zero by detecting reverse of the flow direction of the motor current I. Upon elapse of the normal-direction ON time T01 or the reverse-direction ON time T02 after the time at which the reverse of the flow direction was detected, the abnormal-time motor control section 80 inverts the direction in which electricity is supplied to the motor 20, to thereby cause a continuous current having a triangular waveform to flow through the motor 20. However, during the period in which the switching devices Q1H and Q2L or the switching devices Q2H and Q1L are held ON, the abnormal-time motor control section 80 cannot detect the flow direction of the motor current I from the motor voltage Vm detected by the voltage sensor 32. To solve this drawback, in this abnormal-time motor control routine, the abnormal-time motor control section 80 momentarily turns OFF the four switching devices Q1H, Q2L, Q2H, and Q1L at regular intervals so as to detect the direction of the motor current I from the motor voltage Vm at that time. The purpose of the determination made in step S51 is to determine whether now is the timing for regularly detecting the direction of the motor current I.

In step S51, the abnormal-time motor control section 80 waits for the timing to detect the direction of the motor current I. The cycle of the detection timing is predetermined. Accordingly, arrival of the detection timing can be determined from the elapsed time counted by the timer. When the timing to detect the direction of the motor current I is reached (S51: Yes), in step S52, the abnormal-time motor control section 80 outputs the OFF instruction signals for turning OFF all the switching devices Q1H, Q2L, Q2H, and Q1L. As a result, the switching devices Q1H, Q2L, Q2H, and Q1L of the motor drive circuit 40 are turned OFF. Next, in step S53, the abnormal-time motor control section 80 reads the motor voltage Vm detected by the voltage sensor 32 and the power supply voltage Vb detected by the voltage sensor 33, and then exists from this subroutine, thereby proceeding to step S36 of the main routine. Notably, if the value of the power supply voltage Vb is considered to be fixed, the step for reading the power supply voltage Vb may be omitted.

Next, in step S36, the abnormal-time motor control section 80 determines whether or not the direction of the motor current I has reversed on the basis of the motor voltage Vm (=V1−V2) detected by the voltage sensor 32. That is, the abnormal-time motor control section 80 determines whether or not the direction of the motor current I determined from the motor voltage Vm detected at the preceding detection timing differs from the direction of the motor current I determined from the motor voltage Vm detected at the current detection timing. If the direction of the motor current I has not reversed (S36: No), the abnormal-time motor control section 80 returns to step S35. Accordingly, the switching devices Q2H and Q1L which have been temporarily held OFF return to their original states. Notably, each time the abnormal-time motor control section 80 performs the loop processing of steps S35 and S36, the abnormal-time motor control section 80 memorizes the direction of the motor current I determined from the motor voltage Vm. Next, in step S36, the abnormal-time motor control section 80 compares the direction of the motor current I detected during the preceding loop processing with the direction of the motor current I detected during the current loop processing, to thereby determine whether or not the direction of the motor current I has reversed.

Thus, the switching devices Q1H, Q2L, Q2H, and Q1L are temporarily held OFF at predetermined intervals, and the direction of the motor current I is determined from the motor voltage Vm at that time. After determining that the direction of the motor current I has changed through repetition of the above-described processing (S36: Yes), in the subsequent step S37, the abnormal-time motor control section 80 outputs the ON instruction signals for turning ON the switching devices Q2H and Q1L, to thereby place the four switching devices Q1H, Q2L, Q2H, and Q1L in their original states (with the switching devices Q1H and Q2L held OFF).

Next, in step S38, the abnormal-time motor control section 80 starts counting time, and waits until the elapsed time after the detection of reverse of the direction of the motor current I reaches the reverse-direction ON time T02. During this period, there increases the current flowing through the motor 20 in the (−) direction. After detecting elapse of the reverse-direction ON time T02 (S38: Yes), in step S39, the abnormal-time motor control section 80 outputs the ON instruction signals for turning ON the switching devices Q1H and Q2L and the OFF instruction signals for turning OFF the switching devices Q2H and Q1L. That is, the abnormal-time motor control section 80 outputs the instruction signals for inverting the states of the switching devices Q1H, Q2L, Q2H, and Q1L such that a current flows in a direction opposite the direction in which the current has been flowing. As a result, the motor current I which has increased in the (−) direction starts to decrease.

Next, in step S50, the abnormal-time motor control section 80 performs the above-described current direction determination processing. That is, the abnormal-time motor control section 80 temporarily places all the switching devices Q1H, Q2L, Q2H, and Q1L in the OFF state at predetermined intervals, and reads the motor voltage Vm and the power supply voltage Vb in order to determine the direction of the motor current I on the basis of the current motor voltage Vm (=V1−V2).

Just like in step S36, in step S40, the abnormal-time motor control section 80 determines whether or not the direction of the motor current I has reversed. The abnormal-time motor control section 80 repeatedly performs this processing until the direction of the motor current I reverses. After detecting reverse of the direction of the motor current I (S40: Yes), the abnormal-time motor control section 80 returns to step S31.

Figure 14:
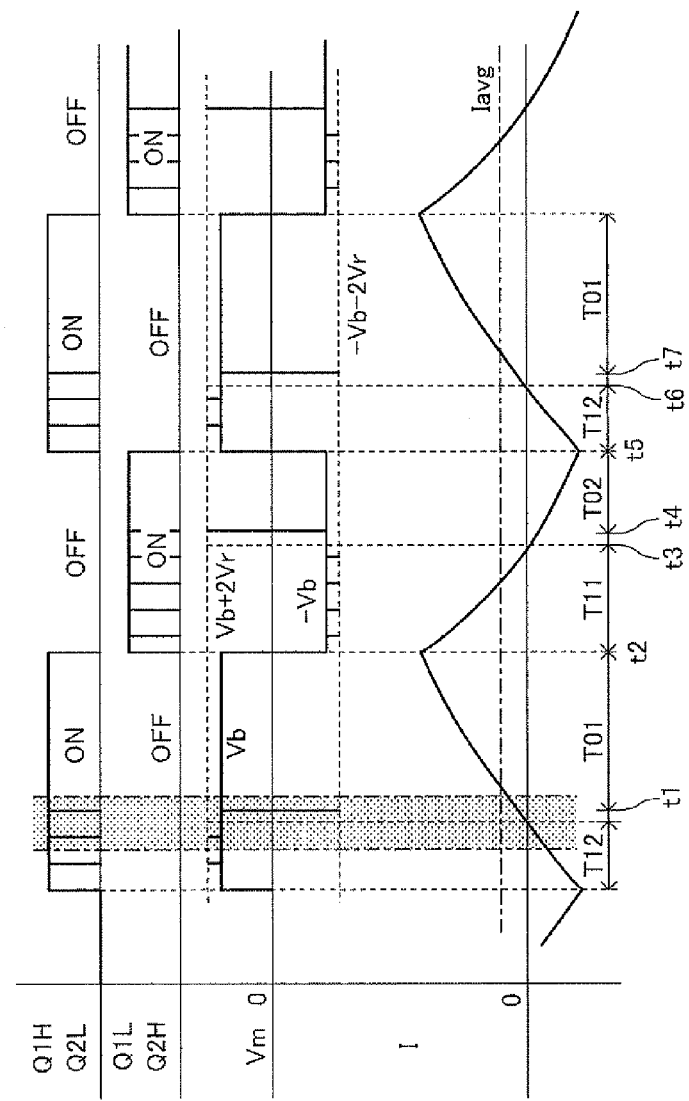
FIG. 14 is a graph showing changes in a switch command signal, motor voltage Vm, and motor current I in the first modification.

FIG. 14 is a graph showing changes in the switch command signals, the motor voltage Vm, and the motor current I during execution of the abnormal-time motor control routine according to the first modification. The motor current I changes such that it has a triangular waveform. One cycle of the triangular waveform corresponds to a period during which the processing of steps S31 to S40 of the above-described abnormal-time motor control routine is performed one time. This graph shows an example of the case where the steering torque tr assumes a positive value; that is, a current is caused to flow through the motor 20 in the (+) direction. Accordingly, the normal rotation ON time T01 is set to be longer than the reverse rotation ON time T02.

Figure 15:
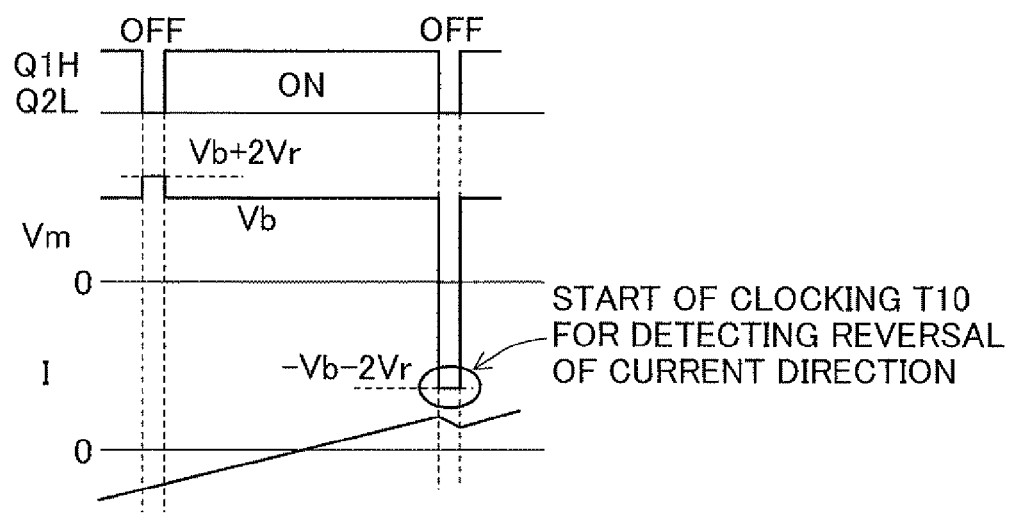
FIG. 15 is an enlarged view of a portion of FIG. 14.

For example, if reverse of the direction of the motor current I is detected at time t1, the switching devices Q1H and Q2L are held ON until the normal rotation ON time T01 elapses after time t1. FIG. 15 is an enlarged view of the hatched portion around time t1 in FIG. 14. As a result, the motor current I increases. Subsequently, at time t2 after elapse of the normal rotation ON time T01, states of the switching devices Q1H, Q2L, Q2H, and Q1L are inverted. That is, the switching devices Q2H and Q1L are turned ON, and the switching devices Q1H and Q2L are turned OFF. Since the normal rotation ON time T01 is set to a value corresponding to the steering torque tr, the peak value of the motor current I at the time when the states of the switching devices Q1H, Q2L, Q2H, and Q1L are inverted increases with the steering torque tr.

The motor current I starts to decrease at time t2. The abnormal-time motor control section 80 starts detecting the direction of the motor current I at predetermined intervals. In this case, each time the timing for detecting the direction of the motor current I comes, the four switching devices Q1H, Q2L, Q2H, and Q1L are brought into the OFF state temporarily. Since this temporary OFF state continues for only a short period of time, in FIG. 14, the OFF state is represented by a line having no time width. The motor current I decreases, and its flow direction reverses to the (−) direction at time t3. After detection of the reverse of the direction of the motor current I at time t4, the switching devices Q2H and Q1L are held ON until the reverse rotation ON time T02 elapses from time t4. As a result, the motor current I flowing in the (−) direction increases. Subsequently, at time t5 after elapse of the reverse rotation ON time T02, the states of the switching devices Q1H, Q2L, Q2H, and Q1L are inverted. That is, the switching devices Q1H and Q2L are turned ON, and the switching devices Q2H and Q1L are turned OFF. As a result, the motor current I starts to increase. Subsequently, the abnormal-time motor control section 80 starts detecting the direction of the motor current I at predetermined intervals. When the direction of the motor current I reverses at time t6, the switching devices Q1H and Q2L are held ON until the normal rotation ON time T01 elapses from time t7 at which reverse of the direction of the current I has been detected.

In FIG. 14, T11 and T12 shown represent the periods from the time at which the states of the switching devices Q1H, Q2L, Q2H, and Q1L are inverted to the time at which the motor current I becomes zero, and are determined on the basis of the circuit equation for the motor 20. Accordingly, the average current Iavg flowing through the motor 20 is set in accordance with the normal rotation ON time T01 and the reverse rotation ON time T02. By means of setting the normal rotation ON time T01 and the reverse rotation ON time T02 to the values corresponding to the steering torque tr, an average current Iavg corresponding to the steering torque can be caused to flow through the motor 20.

According to the above-described first modification, the average current Iavg can be controlled by causing current to flow through the motor 20 in the (+) and (−) directions alternately and adjusting the ratio between the normal rotation ON time T01 during which current flows in the (+) direction and the reverse rotation ON time T02 during which current flows in the (−) direction. Accordingly, even in the case where the magnitude of the steering torque is small, the cycle of the motor current I having a triangular waveform can be rendered long. As a result, the period of vibration generated in the steering system can be set to be long. Thus, there can be solved the problem in that other components of the vehicle resonate with the vibration of the steering system.

<Second Modification>

According to the above-described embodiment, the followability of the steering assist to the steering operation can be improved. However, since the required steering torque increases with the motor rotational speed, the driver may sense a sharp increase in steering torque during the steering operation. To solve this problem, in a second modification, the abnormal-time motor control section 80 estimates the motor rotational speed ω, and forcedly increases the ON time T0 in the case where the magnitude |ω| of the motor rotational speed ω is large, to thereby reduce the sharp increase in steering torque that a driver senses during the steering operation.

Figure 16:
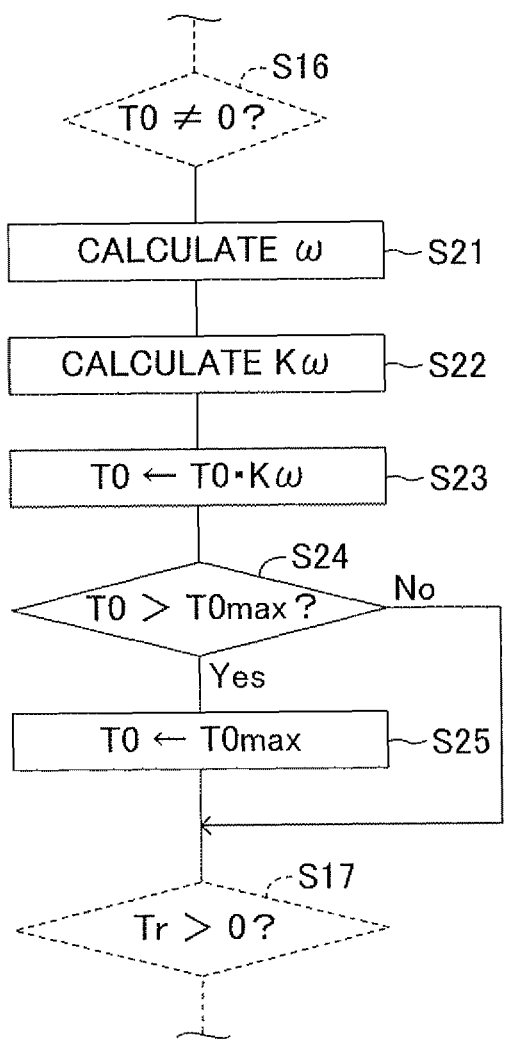
FIG. 16 is a flowchart showing a modified portion of the abnormal-time motor control routine according to a second modification.

In the second modification, only the processing performed by the abnormal-time motor control section 80 differs from that of the above-described embodiment. The remaining configuration is the same as that of the above-described embodiment. FIG. 16 is a flowchart showing a modified portion of the abnormal-time motor control routine executed by the abnormal-time motor control section 80 according to the second modification. In the second modification, the steps S21 to S25 shown in FIG. 16 are added between the steps S16 and S17 of the abnormal-time motor control routine (FIG. 5) of the embodiment. Hereunder, there will be described the processing of the above-described modified portion executed by the abnormal-time motor control section 80.

Upon determining that the motor current I has become zero (S13: Yes), the abnormal-time motor control section 80 executes steps S14 to S16. In the case where the abnormal-time motor control section 80 has determined in step S16 that the ON time T0 is not zero, in step S21, the abnormal-time motor control section 80 calculates the motor rotational speed ω. This step S21 is executed when the motor current I is determined to be zero. Accordingly, the current motor voltage Vm (=V1−V2) is equal to the counter electromotive voltage of the motor 20. Therefore, in step S21, the abnormal-time motor control section 80 calculates the motor rotational speed ω by dividing the motor voltage Vm by the counter electromotive voltage constant φ.

Figure 17:
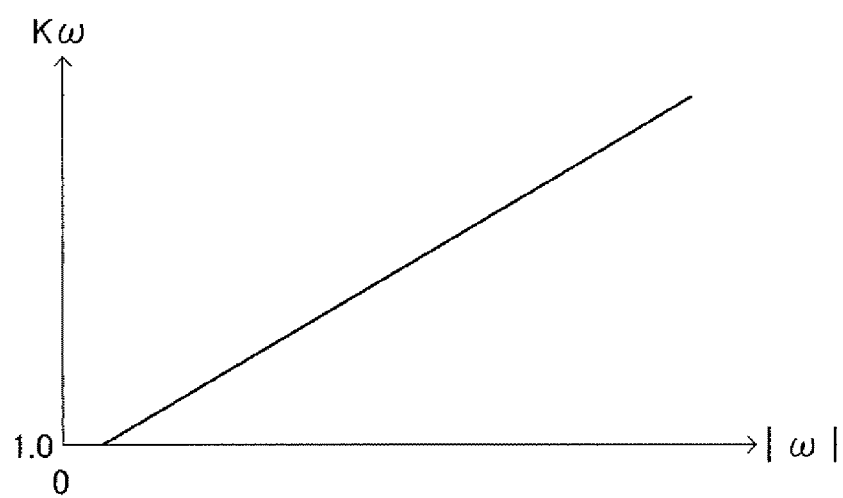
FIG. 17 is a graph showing a correction coefficient setting map according to the second modification.

Next, in step S22, the abnormal-time motor control section 80 calculates a correction coefficient Kω corresponding to the magnitude Iωt of the motor rotational speed ω. The abnormal-time motor control section 80 stores a correction coefficient setting map shown in FIG. 17. This correction coefficient setting map has a property that the correction coefficient Kω increases with the magnitude |ω| of the motor rotational speed ω. The abnormal-time motor control section 80 calculates the correction coefficient Kω with reference to the correction coefficient setting map.

Next, in step S23, the abnormal-time motor control section 80 sets, as a new ON time T0, the value calculated by multiplying the ON time T0 set in step S15 by the correction coefficient Kω (T0=T0×Kω). Next, in step S24, the abnormal-time motor control section 80 determines whether or not the corrected ON time T0 is greater than the upper limit T0max. In the case where the ON time T0 is greater than the upper limit T0max (S24: Yes), in step S25, the abnormal-time motor control section 80 sets the ON time T0 to the upper limit T0max (T0=T0max). In the case where the ON time T0 is not greater than the upper limit T0max (S24: No), the abnormal-time motor control section 80 skips step S25.

After setting the ON time T0 as mentioned above, the abnormal-time motor control section 80 executes the above-described step S17 and steps subsequent thereto.

According to the above-described second modification, the abnormal-time motor control section 80 estimates the motor rotational speed ω, and corrects the ON time T0 such that the ON time T0 increases with the magnitude |ω| of the motor rotational speed ω. Accordingly, the sharp increase in steering torque that a driver senses during the steering operation can be reduced.

Notably, when the inter-terminal voltage of the motor 20 is detected, a problem occurs depending on the configuration of the detection circuit. Specifically, when all the switching devices Q1H, Q2L, Q2H, and Q1L are held OFF, the voltages of the electricity supply terminals 20a and 20b of the motor 20 may become unstable, or the voltage of either one of the electricity supply terminals (20a or 20b) may become negative. In such a case, preferably, any one of the switching devices Q1H, Q2L, Q2H, and Q1L is held ON with the remaining three switching devices held OFF during the period T1 and at a later time at which the counter electromotive voltage is measured. For example, preferably, the switching device Q2H or Q1L is held ON in the case of normal rotation (current is caused to flow in the (+) direction), and the switching device Q1H or Q2L is held ON in the case of reverse rotation (current is caused to flow in the (−) direction).

<Third Modification>

Figure 18:
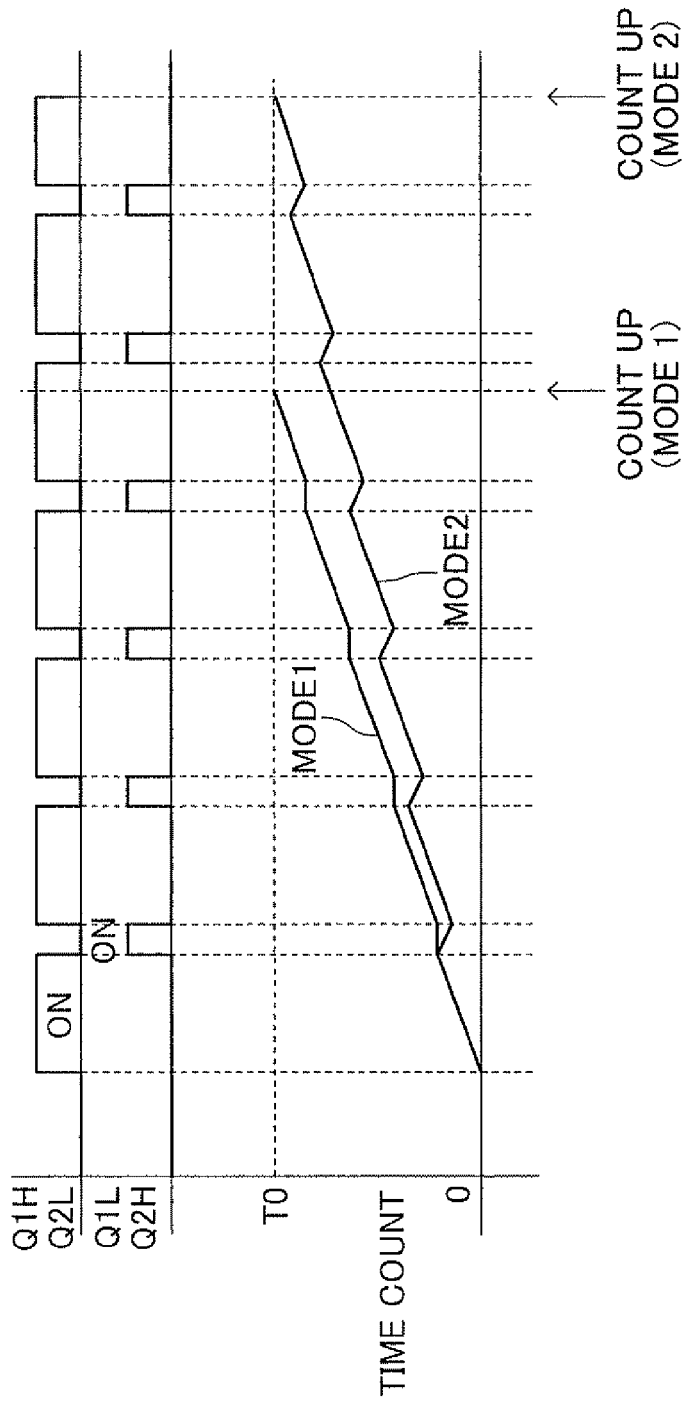
FIG. 18 is a graph showing changes in a switch command signal and time count value in a third modification.

In the above-described embodiment, during the ON time T0 (also referred to as ON period T0), the switching devices Q1H and Q2L or the switching devices Q2H and Q1L are continuously held ON. However, depending on the configuration of the motor drive circuit 40, there may be a case where the switching device Q1H or Q2H of the upper arm circuit 45H cannot be held ON for a long period of time. In such a case, as shown in FIG. 18, preferably, the abnormal-time motor control section 80 turns ON one pair of switching device, and turns OFF the other pair of switching devices at appropriate intervals during each ON period T0. FIG. 18 shows an example of a case where the motor 20 is driven in the normal rotation direction. In this example, the abnormal-time motor control section 80 periodically inserts periods during which the switching devices Q1H and Q2L are temporarily held OFF in the ON period T0 during which the switching devices Q1H and Q2L are held ON, and turns ON the other switching devices Q2H and Q1L during the inserted periods. Notably, when the motor 20 is driven in the reverse rotation direction, switch command signals are output to the opposite switching devices.

In this case, when counting the elapsed ON time T0 in step S20 of abnormal-time motor control routine, the abnormal-time motor control section 80 may not add to the elapsed time the periods during which the switching devices are held OFF (mode 1), or subtract from the elapsed time the periods during which the switching devices are held OFF (mode 2). The graph shown in the lower part of FIG. 18 shows changes in count values of elapsed times in the modes 1 and 2. When a count value reaches the ON time T0, in step S20, the abnormal-time motor control section 80 makes a "Yes" determination.

Notably, in the above-described third modification, OFF periods are periodically inserted in the ON period T0 during which one switching device pair (the switching devices Q1H and Q2L or the switching devices Q2H and Q1L) is held ON, and the other switching device pair (the switching devices Q2H and Q1L or the switching devices Q1H and Q2L) is turned ON during the inserted OFF periods. However, the other switching device pair (the switching devices Q2H and Q1L or the switching devices Q1H and Q2L) need not necessarily be brought into the ON state, and may be held OFF.

The above-described third modification reduces the restriction on the design of the motor drive circuit 40. Accordingly, various motor drive circuits can be employed.

<Fourth Modification>

Figure 7:
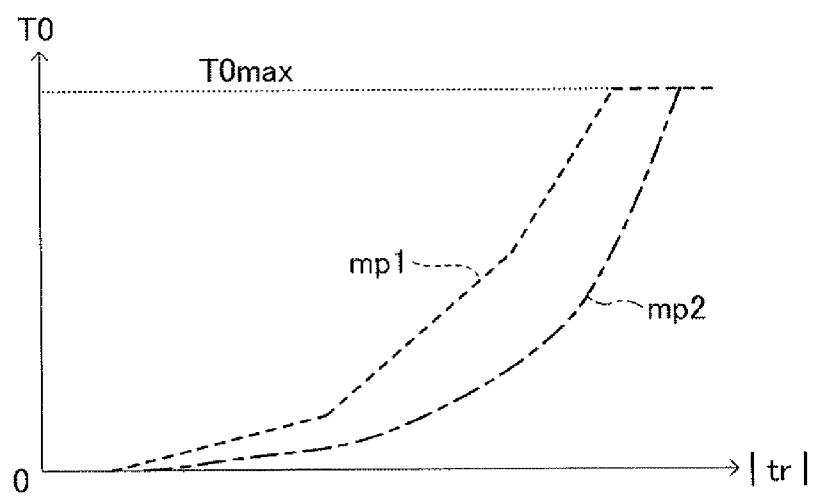
FIG. 7 is a graph showing another on-time setting map.
Figure 19:
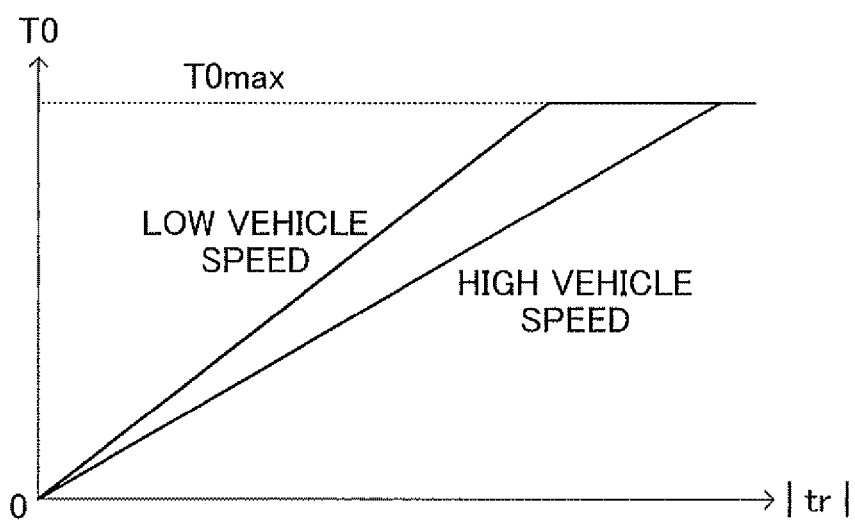
FIG. 19 is a graph showing an on-time setting map according to a fourth modification.

In the above-described embodiment, the ON time T0 is set by use of the on-time setting map shown in FIG. 6 or FIG. 7; however, the ON time T0 may be changed not only with the magnitude |tr| of the steering torque tr but also the vehicle speed. For example, as shown in FIG. 19, a map for determining the ON time T0 from the magnitude |tr| of the steering torque tr may be provided for each of low and high vehicle speed ranges, and the ON time T0 for the high vehicle speed range may be rendered shorter than that for the low vehicle speed range. In addition, the ON time T0 characteristic may be switched, depending on the vehicle speed, among three or more characteristics, rather than between two characteristics as described above.

In this case, in step S14 of the abnormal-time motor control routine, the abnormal-time motor control section 80 preferably reads the vehicle speed vx detected by the vehicle sensor 22 in addition to the steering torque tr. In step S15, preferably, the abnormal-time motor control section 80 sets the ON time T0 on the basis of the vehicle speed vx and the magnitude |tr| of the steering torque tr through use of the on-time setting map corresponding to the vehicle speed vx.

According to the above-described fourth modification, steering does not become too light during high-speed traveling of the vehicle, thereby improving the steering feel.

<Fifth Modification>

When the steering wheel 11 is rotated to the stroke end, the stopper 18 abuts against the corresponding end of the rack housing 16, thereby mechanically restricting the stroke of horizontal motion of the rack bar 14. This state is referred to as "stopper butting." When the steering wheel 11 is rotated quickly and the steering position reaches the stroke end, due to the stopper butting, the rotation of the motor 20 stops suddenly. Therefore, the counter electromotive force of the motor 20 disappears suddenly. As a result, the current flowing through the motor 20 increases sharply, and a current surge may be generated. In order to protect the circuit from such a current surge, the upper limit T0max of the ON time T0 is set. Accordingly, the upper limit T0max restricts the maximum assist quantity.

In order to solve such a drawback, in a fifth modification, a determination is made as to whether or not the steering position is close to the stroke end, and only when the steering position is close to the stroke end, the upper limit T0max is lowered, thereby realizing circuit protection and a sufficient degree of steering assist at the same time.

Figure 20:
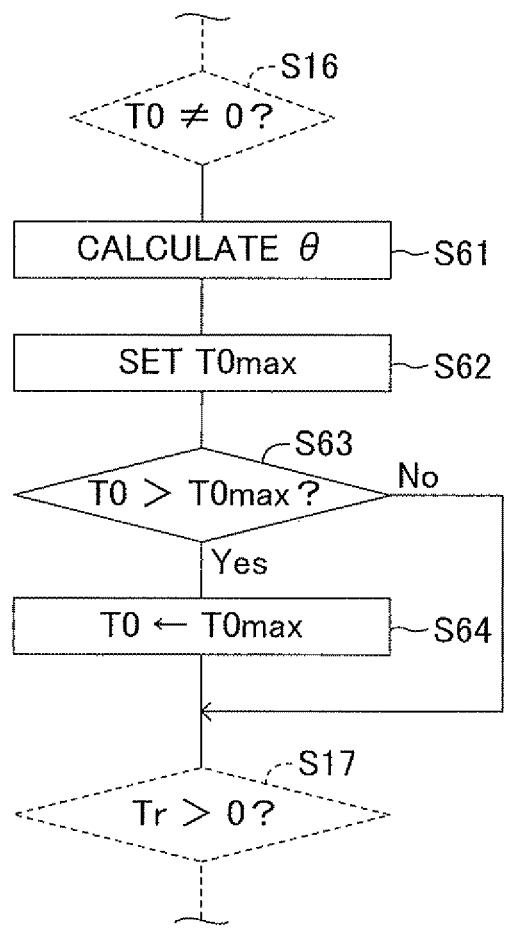
FIG. 20 is a flowchart showing a modified portion of the abnormal-time motor control routine according to a fifth modification.

In the fifth modification as well, only the processing performed by the abnormal-time motor control section 80 differs from that of the above-described embodiment. The remaining configuration is the same as that of the above-described embodiment. FIG. 20 is a flowchart showing a modified portion of the abnormal-time motor control routine executed by the abnormal-time motor control section 80 according to the fifth modification. In the fifth modification, the steps S61 to S64 are added between the steps S16 and S17 of the abnormal-time motor control routine (FIG. 5) of the embodiment. Hereinafter, there will be described the processing of the modified portion of the abnormal-time motor control routine performed by the abnormal-time motor control section 80.

When the abnormal-time motor control section 80 has determined in step S16 that the ON time T0 is not zero, in step S61, it calculates a steering angle θ. For example, the abnormal-time motor control section 80 acquires information representing wheel speeds of the left and right rear wheels, and estimates (through calculation) the steering angle θ from the wheel speeds using the following expression (11).

$$\theta = G \cdot \tan^{-1}\left(\frac{2b(V_1 - V_2)}{a(V_1 + V_2)}\right) \tag{11}$$

Figure 21:
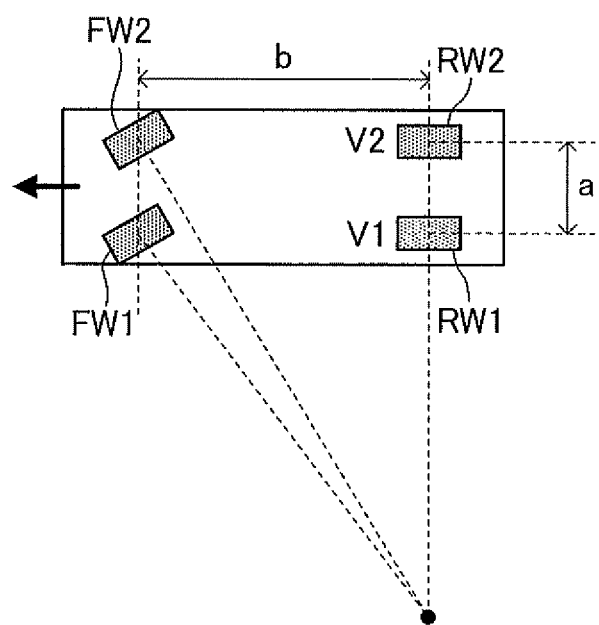
FIG. 21 is an illustration showing parameters used for estimative calculation of a steering angle according to the fifth modification.

In the expression give above, as shown in FIG. 21, V1 represents the rotational speed of the left rear wheel RW1, V2 represents the rotational speed of the right rear wheel RW2, G represents the gear ratio of the gear train between the motor 20 and the front wheels (FW1, FW2), a represents the tread between the left or right rear wheels (RW1, RW2), and b represents the wheelbase.

Figure 22:
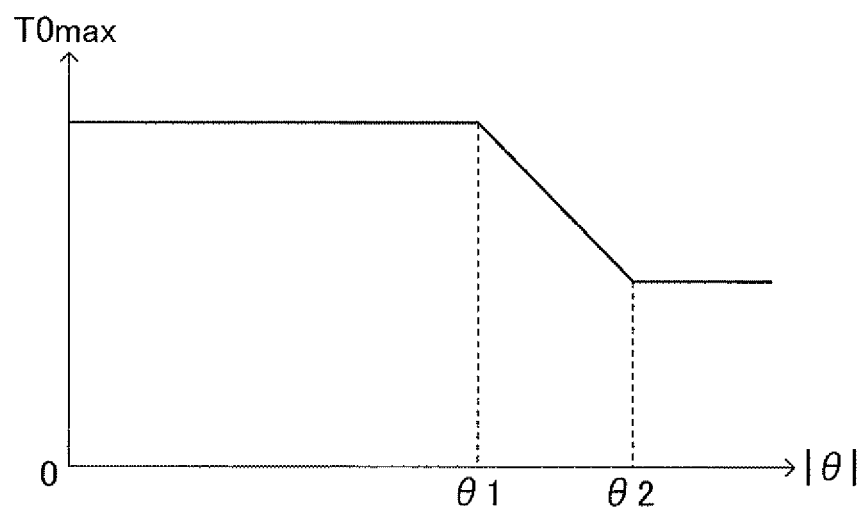
FIG. 22 is a graph showing an on-time upper limit map according to the fifth modification.

Next, in step S62, the abnormal-time motor control section 80 calculates the upper limit T0max of the ON time T0 corresponding to the magnitude |θ| of the steering angle θ. The abnormal-time motor control section 80 stores an ON time upper limit setting map shown in FIG. 22. The ON time upper limit setting map has a property that the upper limit T0max decreases as the magnitude |θ| of the steering angle θ increases after the magnitude |θ| of the steering angle θ becomes larger than a set angle θ1, and the upper limit T0max becomes the minimum after the magnitude |θ| becomes larger than a set angle θ2 (>θ1) near the stroke end. That is, the ON time upper limit setting map has a property that the upper limit T0max used in a steering angle range near the stroke end is smaller than the upper limit T0max used in a steering angle range located away from the stroke end.

Next, in step S63, the abnormal-time motor control section 80 determines whether or not the ON time T0 set in step S15 is greater than the upper limit T0max, and when the On time T0 is greater than the upper limit T0max (S63: Yes), in step S64, the abnormal-time motor control section 80 sets the ON time T0 to the upper limit T0max (T0=T0max). In contrast, when the ON time T0 is not greater than the upper limit T0max (863: No), the abnormal-time motor control section 80 skips step S64.

After setting the ON time T0 as mentioned above, the abnormal-time motor control section 80 executes the above mentioned step S17 and steps subsequent thereto.

According to the above-described fifth modification, the steering angle θ is estimated, and when it is determined on basis of the magnitude |θ| of the estimated steering angle θ that the steering position is close to the stroke end, the upper limit T0max of the ON time T0 is lowered. By virtue of this operation, the average current Iavg flowing through the motor 20 is reduced before the stopper butting occurs. Therefore, even when the stopper butting occurs, the current surge can be suppressed. Also, in a situation where such stopper butting does not occur, the current limit of the motor 20 is relaxed. As a result, circuit protection and a sufficient degree of operation assist can be realized at the same time. Notably, if the steering mechanism 10 is provided with a rotational angle sensor that can detect the steering angle θ, the steering angle θ may be detected by use of this rotational angle sensor.

In the above, the electric power steering apparatuses 1 according to the present embodiment and its modifications have been described. However, the present invention is not limited to the above-described embodiment, and can be modified in various ways without departing from the scope of the present invention.

For example, in the present embodiment, MOS-FETs are used as the switching devices Q1H, Q2H, Q1L, and Q2L provided in the motor drive circuit 40 (H-bridge circuit). Beside the MOS-FETs, other types of switching semiconductor devices may be used.

In addition, in the present embodiment, the inter-terminal voltage Vm of the motor 20 is detected directly. However, the present embodiment may be configured such that there are provided a voltage sensor for detecting the potential V1 at the electricity supply terminal 20a and a voltage sensor for detecting the potential V2 at the electricity supply terminal 20b, and the inter-terminal voltage Vm is detected by calculating the difference (V1−V2) between the potentials detected by these voltage sensors.

In addition, in the present embodiment, the target assist torque t*, the ON time T0, the correction coefficient Kω, and the upper limit T0max are set by use of the assist map, the on-time setting map, the correction coefficient setting map, and the ON time upper limit setting map. In place of these maps, expressions using a function, etc. may be employed.

In the present embodiment, there has been described the electric power steering apparatus 1 of a column assist type in which the torque generated by the motor 20 is applied to the steering shaft 12. However, the electric power steering apparatus may be of a rack assist type in which the torque generated by the motor is applied to the rack bar 14.

In addition, the above-described first to fifth modifications may be combined arbitrarily.

The invention claimed is:

1. An electric power steering apparatus comprising:
   steering torque detection means for detecting steering torque input from a steering wheel to a steering shaft;
   a motor provided in a steering mechanism and generating steering assist torque;
   a motor drive circuit composed of an H bridge circuit including switching devices for normal rotation which are turned on so as to drive the motor in a normal rotation direction and switching devices for reverse rotation which are turned on so as to drive the motor in a reverse rotation direction;
   motor current detection means for detecting motor current flowing through the motor;
   anomaly detection means for detecting an anomaly of the motor current detection means;
   normal-time motor control means, operable when the anomaly of the motor current detection means is not detected, for controlling the motor drive circuit by current feedback control based on a target current set in accordance with the steering torque detected by the steering torque detection means and the motor current detected by the motor current detection means; and
   abnormal-time motor control means, operable when the anomaly of the motor current detection means is detected, for controlling the motor drive circuit on the basis of the steering torque, detected by the steering torque detection means, without use of the current feedback control,
   the electric power steering apparatus being characterized in that the abnormal-time motor control means includes:
   an off-state-voltage detection section which detects voltage between terminals of the motor in a state in which the motor drive circuit is controlled so as not to apply a power supply voltage between the terminals of the motor;
   a current-zero timing detection section which detects a timing at which the current flowing through the motor becomes zero on the basis of the voltage between the terminals of the motor detected by the off-state-voltage detection section;
   an energization time setting section which sets an energization time corresponding to the steering torque detected by the steering torque detection means; and
   a switching control section which turns on the switching devices for normal rotation or the switching devices for reverse rotation for the energization time, set by the energization time setting section, every time the current-zero timing detection section detects the timing at which the current flowing through the motor becomes zero.

2. An electric power steering apparatus according to claim 1, wherein the current-zero timing detection section detects, as the timing at which the current flowing through the motor becomes zero, at least one of a timing at which the voltage between the terminals of the motor is detected to assume a value between a positive-direction determination voltage level at which the flow direction of the current flowing through the motor can be determined as a positive direction and a negative-direction determination voltage level at which the flow direction of the current flowing through the motor can be determined as a negative direction, and a timing at which the voltage between the terminals of the motor is detected to have changed from the positive-direction determination voltage level to the negative-direction determination voltage level or have changed from the negative-direction determination voltage level to the positive-direction determination voltage level.

3. An electric power steering apparatus according to claim 1, wherein the switching control section selectively turns on the switching devices for normal rotation or the switching devices for reverse rotation in accordance with a rotational direction corresponding to the direction of the steering torque, for the energization time set by the energization time setting section.

4. An electric power steering apparatus according to claim 1, wherein
   the energization time setting section individually sets the energization time of the switching devices for normal rotation and the energization time of the switching devices for reverse rotation in accordance with the steering torque detected by the steering torque detection means; and
   the switching control section alternately turns on the switching devices for normal rotation and the switching devices for reverse rotation for the individually set energization times every time the timing at which the current flowing through the motor becomes zero is detected.

5. An electric power steering apparatus according to claim 1, further comprising:
   a rotational speed estimation section which operates, when the current-zero timing detection section detects the timing at which the current flowing through the motor becomes zero, so as to estimate the rotational speed of the motor on the basis of the voltage between the terminals of the motor detected by the off-state-voltage detection section before the switching devices for normal rotation or the switching devices for reverse rotation are turned on; and an energization time correction section which corrects the energization time on the basis of the rotational speed of the motor estimated by the rotational speed estimation section such that in the case where the rotational speed is high, the energization time becomes longer as compared with the case where the rotational speed is low.

6. An electric power steering apparatus according to claim 1, wherein an upper limit is set for the energization time; and the electric power steering apparatus further comprises:

a steering position detection section which detects steering position; and an upper limit change section which changes the upper limit of the energization time such that in the case where the steering position detected by the steering position detection section is close to a stroke end which mechanically defines an end of a steerable range, the upper limit decreases as compared with the case where the detected steering position is located away from the stroke end.

* * * * *